US012655564B2

(12) United States Patent
Patterson et al.

(10) Patent No.: US 12,655,564 B2
(45) **Date of Patent: \*Jun. 16, 2026**

(54) DISTRIBUTED NETWORKED LAUNDRY MACHINE CONTROL AND OPERATION

(71) Applicant: Clarified Inc., San Francisco, CA (US)

(72) Inventors: Tristan Scott Patterson, San Francisco, CA (US); Jonathan Christensen, Eagle, CO (US); Stuart Sonatina, Santa Cruz, CA (US)

(73) Assignee: Clarified Inc., San Francisco, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 19/386,384

(22) Filed: Nov. 12, 2025

(65) Prior Publication Data

US 2026/0071369 A1 Mar. 12, 2026

Related U.S. Application Data

(63) Continuation of application No. 18/908,116, filed on Oct. 7, 2024, which is a continuation of application No. 18/657,585, filed on May 7, 2024, now Pat. No. 12,110,628, which is a continuation of application No. 18/543,554, filed on Dec. 18, 2023, now Pat. No.
(Continued)

(51) Int. Cl.
| | |
|---|---|
| *G05B 19/409* | (2006.01) |
| *D06F 31/00* | (2006.01) |
| *D06F 34/05* | (2020.01) |
| *D06F 34/28* | (2020.01) |
| *D06F 39/14* | (2006.01) |
| *D06F 101/14* | (2020.01) |

(Continued)

(52) U.S. Cl.
CPC .............. *D06F 34/28* (2020.02); *D06F 31/00* (2013.01); *D06F 34/05* (2020.02); *D06F 39/14* (2013.01); *G05B 19/409* (2013.01); *D06F 2101/14* (2020.02); *D06F 2101/20* (2020.02); *D06F 2105/44* (2020.02); *G05B 2219/2633* (2013.01)

(58) Field of Classification Search
CPC .......... D06F 34/28; D06F 34/05; D06F 31/00; D06F 39/14; G05B 39/14
See application file for complete search history.

(56) References Cited

U.S. PATENT DOCUMENTS

| | | |
|---|---|---|
| 5,036,966 A | 8/1991 | Kaspar et al. |
| 5,734,150 A | 3/1998 | Brown et al. |
| | (Continued) | |

*Primary Examiner* — Gary Collins
(74) *Attorney, Agent, or Firm* — Cognition IP, P.C.; Edward Steakley

(57) ABSTRACT

Methods, system and apparatus for the controlling laundry machines in a laundry facility. A user device receives a list of machines for a laundry facility and displays them on a machine control user interface. The user may then make a selection of a machine, a selection of an operation type and a selection of one or more operational parameters associated with the selected operation type. The selection of the operation type and the one or more operational parameters may be made on the user device or on the selected machine. The machine control user interface may then display the user selections, an estimated duration and a cost. The estimated duration and cost may be based on the selected machine, selected operation type and the one or more selected operational parameters.

20 Claims, 24 Drawing Sheets

Related U.S. Application Data 11,993,887, which is a continuation of application No. 17/065,774, filed on Oct. 8, 2020, now Pat. No. 11,920,274.

(60) Provisional application No. 62/912,676, filed on Oct. 9, 2019.

(51) Int. Cl.
 *D06F 101/20* (2020.01)
 *D06F 105/44* (2020.01)

(56) References Cited

U.S. PATENT DOCUMENTS

| | | | |
|---|---|---|---|
| 8,255,323 | B1 | 8/2012 | Casey et al. |
| 8,958,846 | B2 | 2/2015 | Freeny, Jr. |
| 9,092,768 | B2 | 7/2015 | Breitenbach et al. |
| 9,898,884 | B1 | 2/2018 | Arora et al. |
| 10,210,501 | B2 | 2/2019 | Low et al. |
| 11,993,887 | B2 * | 5/2024 | Patterson ................ D06F 34/05 |
| 2015/0013074 | A1 | 1/2015 | Ficke et al. |
| 2016/0232499 | A1 | 8/2016 | Berman et al. |
| 2017/0081796 | A1 | 3/2017 | Belveal et al. |
| 2017/0085390 | A1 | 3/2017 | Belveal et al. |
| 2018/0305856 | A1 | 10/2018 | Welch |
| 2019/0194856 | A1 | 6/2019 | Mukundala |
| 2022/0195649 | A1 | 6/2022 | Johansson et al. |

* cited by examiner

Washing
Machine
115

Machine Controller
170B

Lock Control Module
171B

Network Module
172B

Payment Interface Module
173B

Dryer Operation Module
174B

Sensor Module
175B

Drum Weight
Sensor
180B

Voltage/Current
Sensor
181B

Exhaust
Temperature Sensor
182

Exhaust Humidity
Sensor
183

Drum Temperature
Sensor
184

Drum Humidity
Sensor
185

200

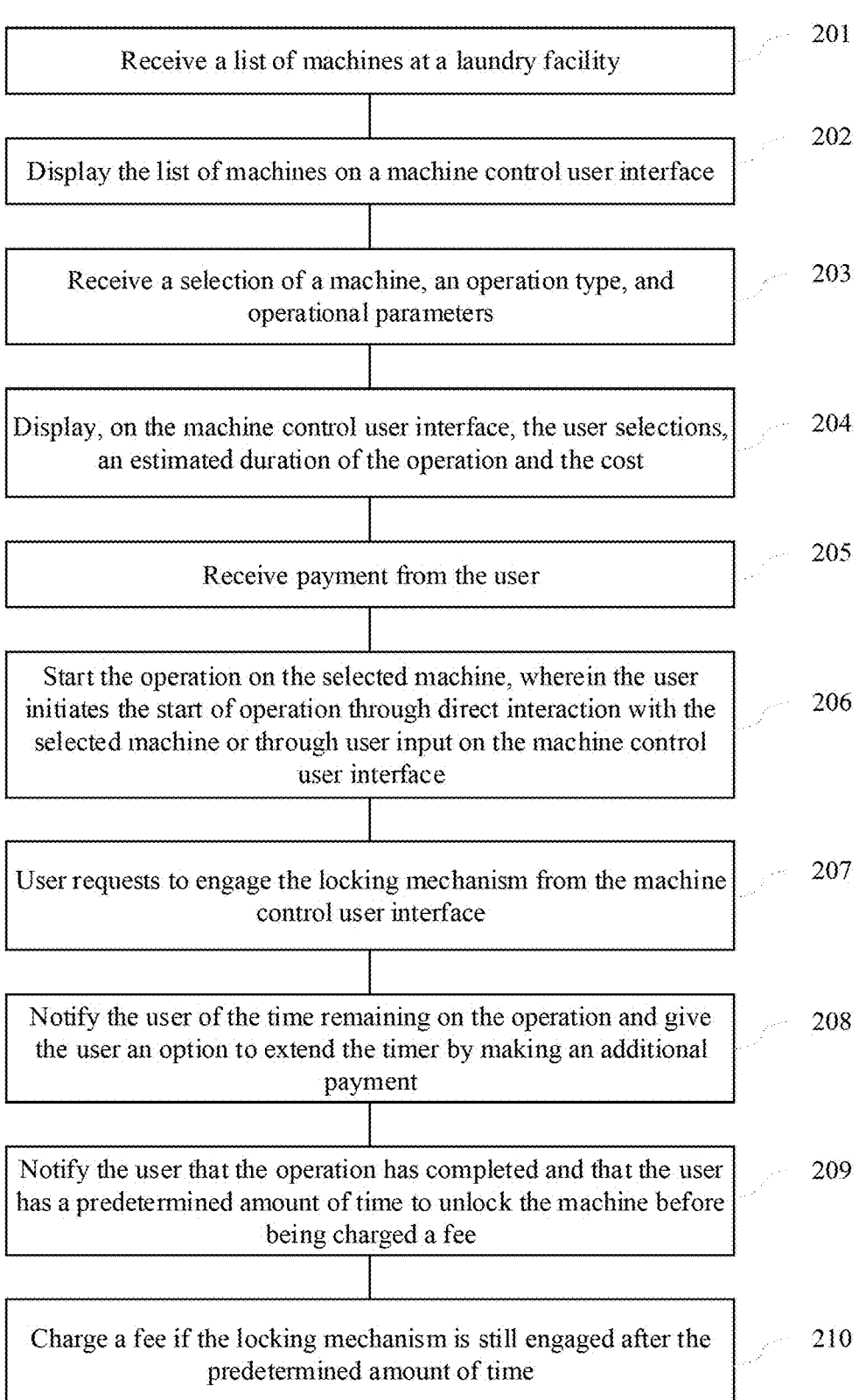

| | |
|---|---|
| Receive a list of machines at a laundry facility | 201 |
| Display the list of machines on a machine control user interface | 202 |
| Receive a selection of a machine, an operation type, and operational parameters | 203 |
| Display, on the machine control user interface, the user selections, an estimated duration of the operation and the cost | 204 |
| Receive payment from the user | 205 |
| Start the operation on the selected machine, wherein the user initiates the start of operation through direct interaction with the selected machine or through user input on the machine control user interface | 206 |
| User requests to engage the locking mechanism from the machine control user interface | 207 |
| Notify the user of the time remaining on the operation and give the user an option to extend the timer by making an additional payment | 208 |
| Notify the user that the operation has completed and that the user has a predetermined amount of time to unlock the machine before being charged a fee | 209 |
| Charge a fee if the locking mechanism is still engaged after the predetermined amount of time | 210 |

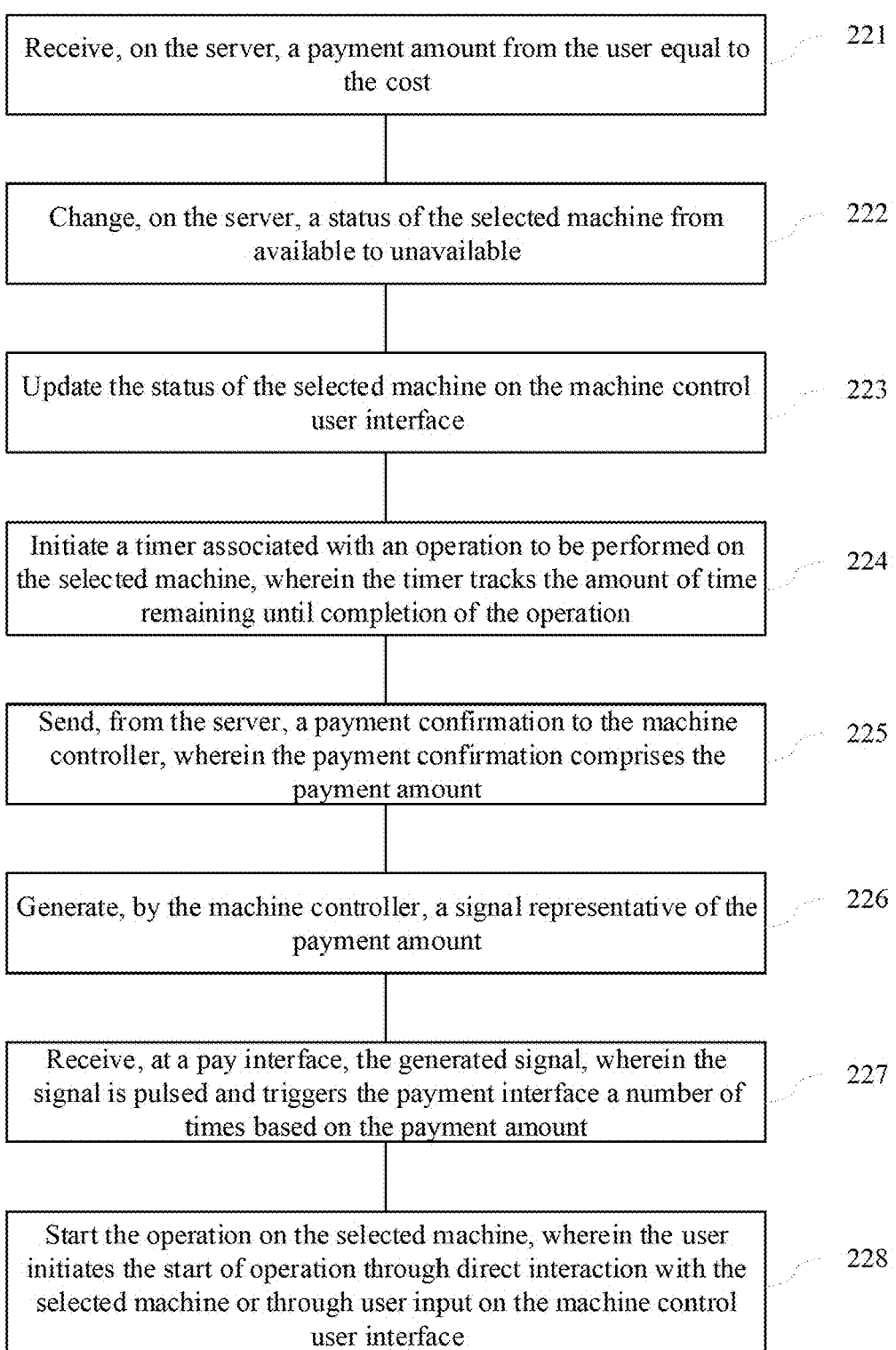

Receive, on the server, a payment amount from the user equal to the cost
— 221

Change, on the server, a status of the selected machine from available to unavailable
— 222

Update the status of the selected machine on the machine control user interface
— 223

Initiate a timer associated with an operation to be performed on the selected machine, wherein the timer tracks the amount of time remaining until completion of the operation
— 224

Send, from the server, a payment confirmation to the machine controller, wherein the payment confirmation comprises the payment amount
— 225

Generate, by the machine controller, a signal representative of the payment amount
— 226

Receive, at a pay interface, the generated signal, wherein the signal is pulsed and triggers the payment interface a number of times based on the payment amount
— 227

Start the operation on the selected machine, wherein the user initiates the start of operation through direct interaction with the selected machine or through user input on the machine control user interface
— 228

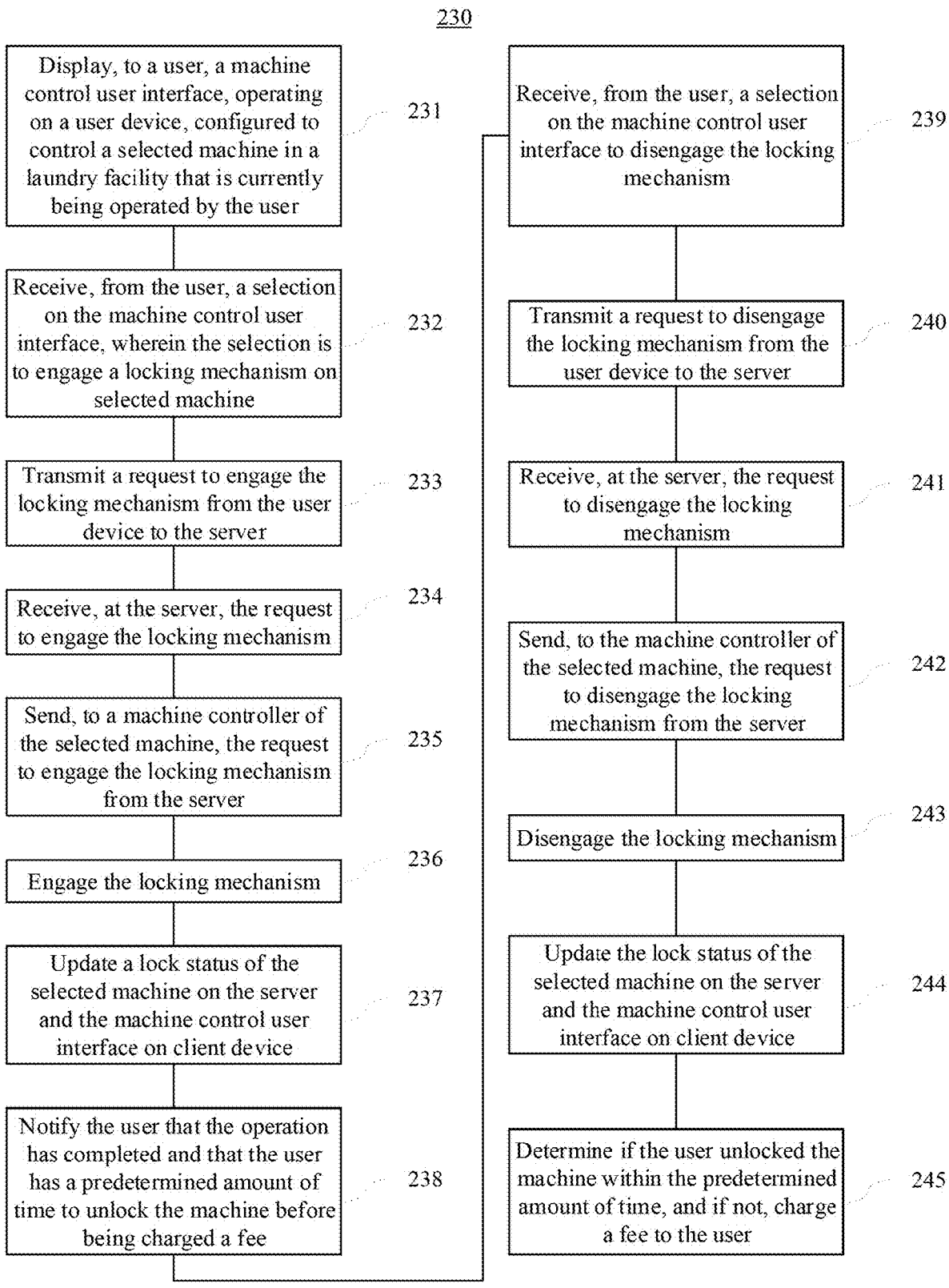

Display, to a user, a machine control user interface, operating on a user device, configured to control a selected machine in a laundry facility that is currently being operated by the user — 231

Receive, from the user, a selection on the machine control user interface, wherein the selection is to engage a locking mechanism on selected machine — 232

Transmit a request to engage the locking mechanism from the user device to the server — 233

Receive, at the server, the request to engage the locking mechanism — 234

Send, to a machine controller of the selected machine, the request to engage the locking mechanism from the server — 235

Engage the locking mechanism — 236

Update a lock status of the selected machine on the server and the machine control user interface on client device — 237

Notify the user that the operation has completed and that the user has a predetermined amount of time to unlock the machine before being charged a fee — 238

Receive, from the user, a selection on the machine control user interface to disengage the locking mechanism — 239

Transmit a request to disengage the locking mechanism from the user device to the server — 240

Receive, at the server, the request to disengage the locking mechanism — 241

Send, to the machine controller of the selected machine, the request to disengage the locking mechanism from the server — 242

Disengage the locking mechanism — 243

Update the lock status of the selected machine on the server and the machine control user interface on client device — 244

Determine if the user unlocked the machine within the predetermined amount of time, and if not, charge a fee to the user — 245

DISTRIBUTED NETWORKED LAUNDRY MACHINE CONTROL AND OPERATION

CROSS-REFERENCE TO RELATED APPLICATIONS

This application is a continuation of U.S. application Ser. No. 18/908,116, filed on Oct. 7, 2024, which is a continuation of U.S. application Ser. No. 18/657,585, filed on May 7, 2024, which is a continuation of U.S. application Ser. No. 18/543,554, filed on Dec. 18, 2023, which is a continuation of U.S. application Ser. No. 17/065,774, filed Oct. 8, 2020, which claims the benefit of U.S. Provisional Application No. 62/912,676, filed Oct. 9, 2019, which are hereby incorporated by reference in their entirety.

FIELD

The present invention relates generally to the controlling, managing, and operation of laundry machines, and more particularly, to methods and systems for intelligently interfacing with laundry machines and using machine learning to analyze machine usage and make recommendations.

BACKGROUND

In typical commercial laundry applications, a patron's laundry is not always secure. A person must remain in the laundry facility for the duration of their washing and drying operations or risk having their laundry tampered with or stolen. Many people do not have to time to wait around for hours waiting for their laundry to finish and must multi-task, leaving their laundry vulnerable to theft. In typical commercial laundry applications either a manual lock, timed lock, or no locking mechanism is used.

SUMMARY

The systems and methods described herein provide for the controlling laundry machines in a laundry facility. In one embodiment a user device receives a list of machines for a laundry facility and displays them on a machine control user interface. The user may then make a selection of a machine, a selection of an operation type and a selection of one or more operational parameters associated with the selected operation type. The selection of the operation type and the one or more operational parameters may be made on the user device or on the selected machine. The machine control user interface may then display the user selections, an estimated duration and a cost. The estimated duration and cost may be based on the selected machine, selected operation type and the one or more selected operational parameters.

The system may then receive a payment from the user a payment amount equal to the cost. Upon receiving the payment, the server may change the status of the selected machine. The machine control user interface may also be updated to display the new status of the selected machine. After receiving the payment, a timer may be initiated for the operation to be performed on the selected machine. The timer may be used to tracks the amount of time remaining until completion of the operation.

A payment confirmation may be sent to the selected machine. The machine controller may receive the payment confirmation and the payment amount. The machine controller may then generate a signal representative of the payment amount. The machine controller may then trigger a payment interface on the selected machine by pulsing the signal a number of times, based on the payment amount.

Upon triggering the payment interface, the selected machine may now be ready to start operation. The user may initiate the start of operation by directly interacting with the machine or through user input on the machine control user interface. The user may then lock the machine to keep their clothing secure. To lock the machine, the user makes a selection on the machine control user interface to engage the locking mechanism. The selection may then be sent to the server to request that the machine be locked. The request may then be directed to the machine controller or the locking mechanism directly. Upon locking of the machine, the status of the machine on the server and on the user interface is updated.

The system may generate one or more notifications relating to the selected machine or the operation currently being performed. Notifications may be generated and displayed to the user when the amount of time remaining has dropped below a predetermined threshold, when the operation completes, when the timer ends, or when additional time may need to be added to complete the operation (e.g. needing to add more time to a dryer because the clothes are still damp).

The system may also display an option to make an additional payment for more time to be added to the timer and time remaining on the operation. The additional payment may cause the machine controller to trigger the payment interface on the selected machine in order to extend the operation.

Upon completion of the operation and the ending of the first timer, a second timer may be initiated. The second timer may be of a predetermined amount of time. This second timer represents an amount of time that a user has to disengage the locking mechanism. If the locking mechanism is still engaged after the second timer ends a fee may be charged to the user. The fee may be charged in predetermined blocks of time (charged every 15 minutes) or prorated based on the time calculated from the ending of the second timer to the unlocking of the machine.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIG. 2A is a flow chart illustrating an exemplary method that may be performed in accordance with some embodiments.

FIG. 2B is a flow chart illustrating additional steps that may be performed in accordance with some embodiments.

FIG. 2C is a flow chart illustrating additional steps that may be performed in accordance with some embodiments.

DETAILED DESCRIPTION

Figure 1A:
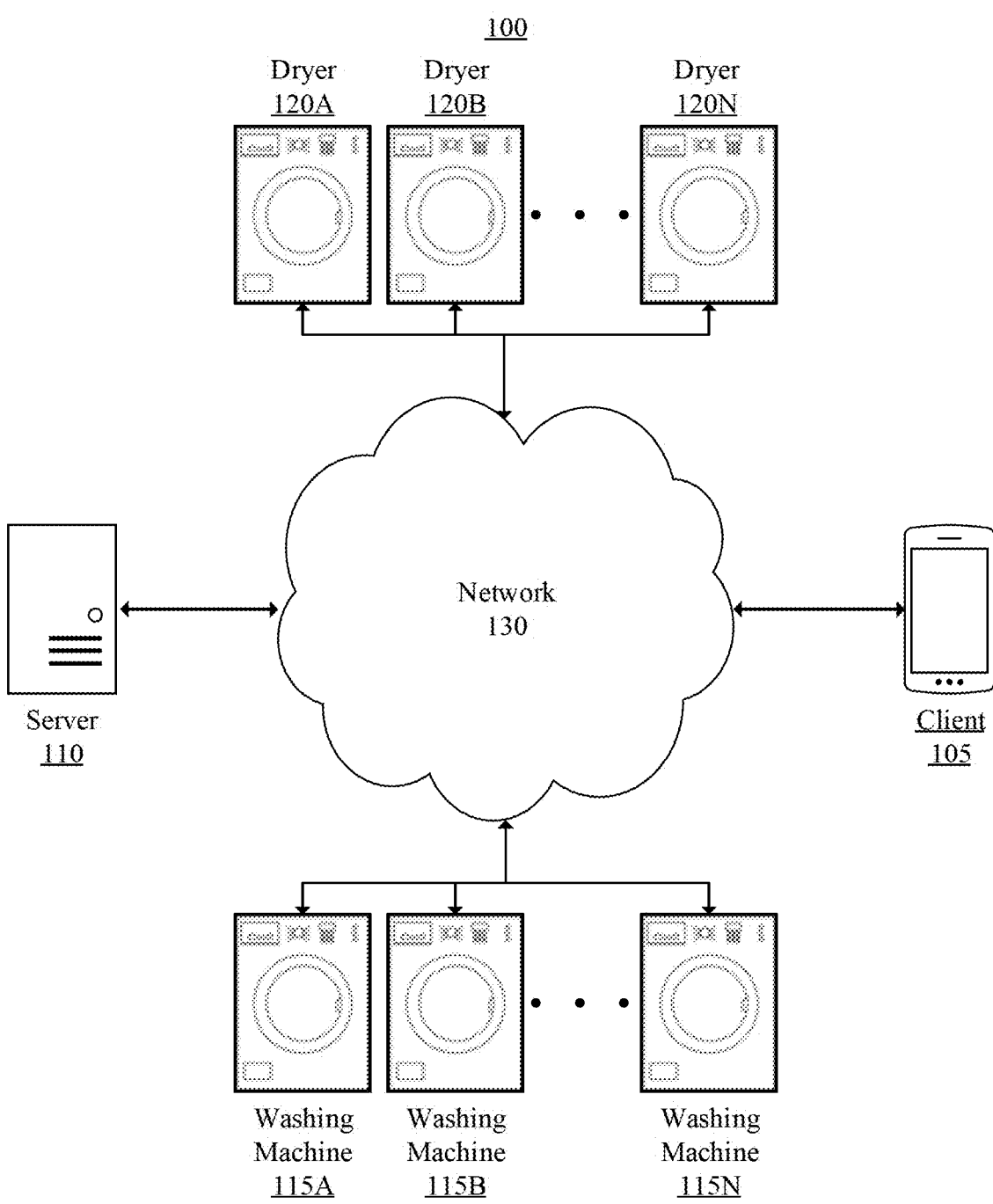
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

The following generally relates to a system managing and controlling laundry facilities and the machines within the laundry facility.

FIG. 1A is a diagram illustrating an exemplary environment in which some embodiments may operate. The diagram shows an example of a control system 100 for locking laundry, in accordance with some embodiments. The example shown includes client device 105, server 110, washing machines 115A-N and dryers 120A-N. Server 110 may be an example of, or include aspects of, the corresponding element or elements described with reference to FIG. 1B. Client 105 may be an example of, or include aspects of, the corresponding element or elements described with reference to FIG. 1C. Washing machine 115 may be an example of, or include aspects of, the corresponding element or elements described with reference to FIG. 1D. Dryer 120 may be an example of, or include aspects of, the corresponding element or elements described with reference to FIG. 1D.

Client device 105 may be one or more personal computers, personal digital assistants (PDAs), tablet computing devices, laptop computers, smart phones, e-readers or other systems capable of operating a standalone application or web-based application in a browser.

Figure 1B:
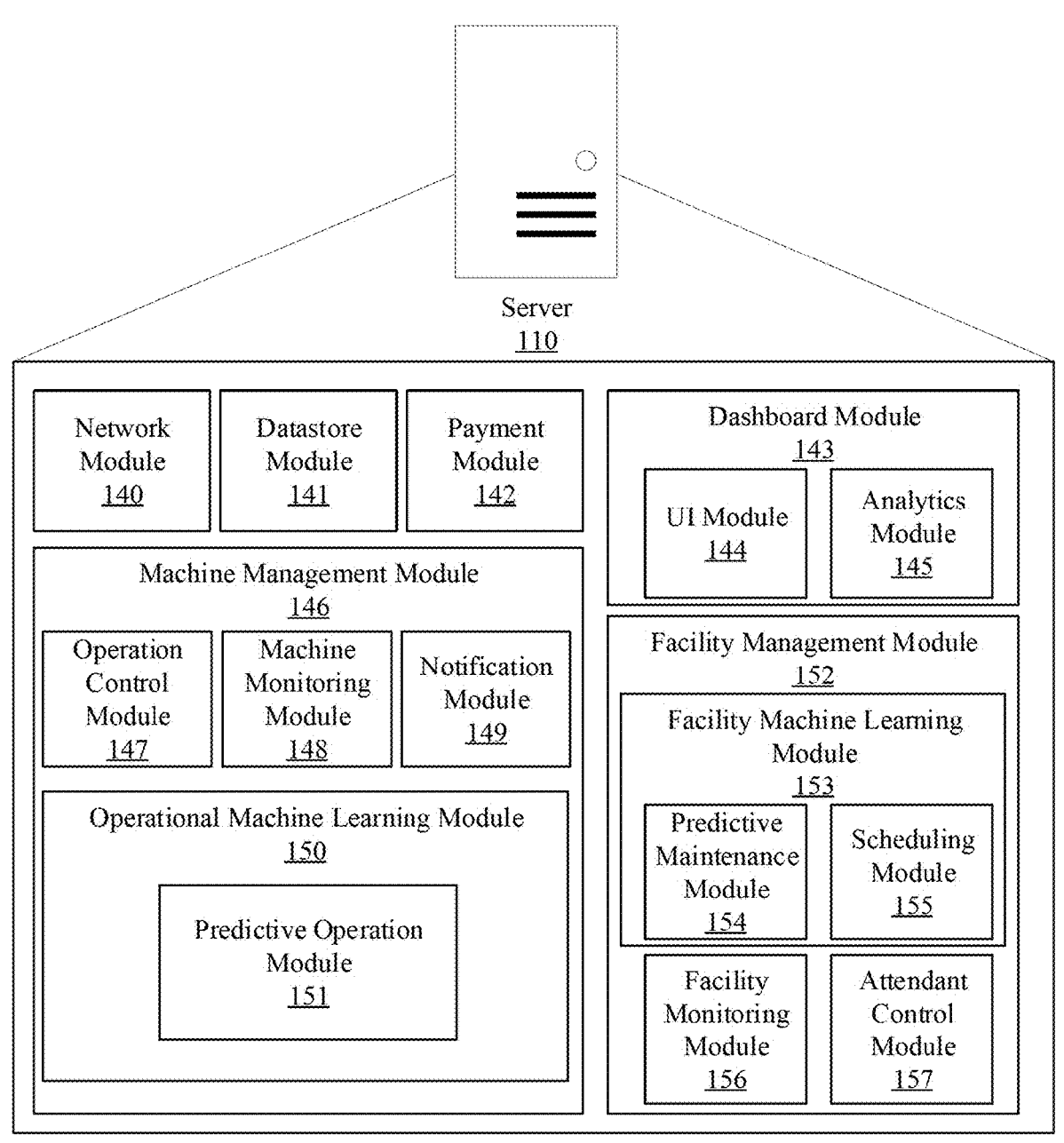
FIG. 1B is a diagram illustrating an exemplary computer system in accordance with aspects of the present disclosure.

Server 110 may be any computing device(s) capable of executing the operation of the control system, including operation of the modules of FIG. 1B. Server 110 may be connected through a network 130 to client device 105, washing machines 115A-N and dryers 120A-N.

FIG. 1B is a diagram illustrating an exemplary server 110 in accordance with aspects of the present disclosure. Server 110 may comprise a network module 140, datastore module 141, payment module 142, dashboard module 143, machine management module 146 and facility management module 152, Network module 140 may transmit and receive data from other computing systems via a network. In some embodiments, the network module 140 may enable transmitting and receiving data from the Internet. Data received by the network module 140 may be used by the other modules. The modules may transmit data through the network module 140.

Datastore module 141 may be a storage media, such disk drives, solid state drives, tape drives, RAM, ROM, or anything other media that can be read from and written to. The datastore module 141 may comprise one or more structured or unstructured databases or other data structures. The datastore module 141 may be configured to store information received from client device 105, washing machines 115A-N, dryers 120A-N, network module 140, payment module 142, dashboard module 143, machine management module 146, facility management module 152 or other sources of data connected to the server. Datastore module 141 may be connected to a cloud based or network-area storage solution. Datastore module 141 may store user information, machine information, facility information, machine learning models, predictive models, maintenance logs, energy and water consumption logs, as well as time-series data on the operation of the machines and their sensor readings.

Payment module 142 may be configured to accept payment information from a client device 105, validate the payment information from the client device, and process payment transactions with financial institutes, credit card companies or clearinghouses. Upon processing the transaction, the payment module 142 may generate a payment confirmation to be forwarded to the machine management module 146.

Dashboard module 143 may comprise UI module 144 and analytics module 145. The dashboard module 143 may control and manage the UI module 144. UI module may generate one or more dashboards. A request for a user dashboard from a client device 105 may be received by the dashboard module 143. The UI module 144 may then access historical data for the user from datastore module 141. Data on the user's previous purchases, historic machine usage, energy consumption, environmental impact, profile preferences or combination thereof, may be analyzed by the analytics module 145 to generate useful data visualizations to be presented to the user on the client device user interface and/or user dashboard.

A request for an administrator or facility operator dashboard from a client device 105 may be received by the dashboard module 143. The UI module 144 may then access historical data for the desired facility or group of facilities from datastore module 141. Data relating to the facility or group of facilities may include machine status, current and historical machine usage, repair and maintenance logs, user information for all users of the facility or group of facilities, administrator or facility operator profile information, energy consumption and environmental impact for the facility, group of facilities or individual machines or groups of machines or combination thereof, may be analyzed by the analytics module 145 to generate useful data visualizations to be presented to the administrator or facility operator on the client device user interface and/or dashboard.

Machine management module 146 may comprise operation control module 147, machine monitoring module 148, notification module 149 and operational machine learning module 150. The machine management module 146 may receive the user selections from client device 105 over network module 140, information relating to the selection from the datastore module 141 and payment confirmation from the payment module 142. Machine management module 146 may be configured to calculate, receive or retrieve a duration of the desired machine operation. The duration of the machine operation may be determined based on the selected machine, service type, one or more operational parameters selected by the user and the amount paid by the user. The cost of the machine operation may also be based on the selected machine, service type, one or more operational parameters selected by the user and the desired duration of operation for the machine. For example, a user may choose a specified amount of time for a dryer to operate instead of choosing an amount to pay. The system may determine the cost based at least partly on the duration and the duration based at least partly on the amount paid.

The machine management module 152 may allow a user to transfer responsibility and authority over operation of a machine to another user or attendant. For example, if a user is unable to complete an operation on a machine and must leave, the user may transfer control over the machine to the attendant at the facility or to another user. The attendant or the user that has taken over control of the machine from the original user may then be able to control the machine as if they were the original user. Additional payment may be pulled from the original user's electronic wallet or charged to the original user.

Operation control module 147 may communicate and manage individual washing machines 115 or dryers 120. Operation control module 147 may initiate a timer corresponding to the duration of the chosen machine operation. The status of the machine may be changed from available to unavailable upon receiving payment confirmation, initiating the timer, or the start of the machine operation. Operation control module 147 may also receive, from the client device 105, a request to start operation of the machine. Alternatively, the user may select operational parameters from the machine itself and choose to start operation of the machine. The selections made by the user at the physical machine and the initiating the operation of the machine through physical interaction with the machine may be transmitted to the operation control module 147.

Operation control module 147 may also receive, from the client device 105, requests to engage or disengage (lock or unlock) a locking mechanism on the selected machine. The lock/unlock request is transmitted from the operation control module 147 to the washing machine 115 or dryer 120. A locking status of the chosen machine may then be updated by the operation control module 147, and displayed on the client device 105.

Operation control module 147 may also receive requests to add time to the timer, to extend the duration of operation of the machine. Along with the request, the operation control module 147 may receive an additional payment confirmation associated with the received request. The operational control module 147 may then send a request to the washing machine 115 or dryer 120 to add time to the duration of the operation.

Operation control module 147 may communicate with payment interface module 173A and 173B. A signal may be generated by the operation control module 147 upon receiving payment confirmation. The signal may be a pulsed signal representing a vend amount to be paid at the machine. The pulsed signal may be sent to payment interface module 173A or 173B of the selected machine to be trigger a vending operation to electronically add funds to the physical machine.

Machine monitoring module 148 may receive information from one or more machines. The machine monitoring module 148 may track the usage of each machine. Energy consumption, operating parameters, operational status, lock status, and sensor readings may all be monitored and tracked. The information obtained from the machine monitoring module 148 may be used by the operational machine learning module 150 in the training of models for the predictive operation module 151. The information obtained may also be used by the facility machine learning module 153 in the training of models for the predictive maintenance module 154 and the scheduling module 155.

Notification module 149 may generate notifications to be sent to the client device 105. The notification module 149 may send and receive information from the client device

105, network module 140, datastore module 141, payment module 142, operation control module 147, machine monitoring module 148, operational machine learning module 150, predictive operation module 151 or combination thereof. The notification module 149 may be configured to send a notification to the client device 105 once the timer on the operation reaches a predetermined level (time remaining), the operation has been completed successfully or there is no time left on the timer. The determination that the operation has been completed successfully may be based time and/or sensor readings. Based on sensor data, it may be determined that the operation has successfully completed even if there is still time remaining on the timer. For example, a user may be using a dryer to dry a load of clothing. The time required to completely dry the load of clothing is determined by a number of different variables. The size of the load, material of the articles making up the load, temperature of the dryer drum, temperature of the air entering the dryer, humidity level of the air entering the dryer and many other environmental, load, and machine variables can all affect the drying time of the load.

When the timer reaches the threshold, a notification may be sent to the client device 105 to inform the user that the time remaining on the operation is running out. The notification may also inform the user on the status of the operation, such as if the operation has been completed or will complete before time runs out (based on sensor data), if additional time may be needed to complete the operation or an estimated/predicted amount of additional time and cost to complete the operation. The user may be provided with an option to pay for additional time to be added to the operation and timer of the operation. The user may select an amount of time to add or an amount of money to add. When the user selects the amount of time to add, the cost of the addition may be calculated and presented to the user for payment. When the user selects the amount money to add, the amount of additional time may be calculated and displayed for the user on the client device 105.

If a user chooses to add additional time and/or money to the operation on the machine, they may submit an additional payment, resulting in addition of time to the operation of the machine and the timer for the operation.

The operational machine learning module 150 may be trained on operational usage data from one or more machines from one or more facilities. The data may include operation type, operational parameters, type of machine, model of machine, current and historical sensor readings from the machine and the environment the machine is operating in, total runtime, total number or operations performed, total number of machine uses and maintenance and repair logs. The data may be analyzed as time-series data. The machine learning models may be trained in an unsupervised, supervised or semi-supervised manner. The machine learning module 150 may comprise decision trees such as classification trees, regression trees, boosted trees, bootstrap aggregated decision trees, random forests, rotation forests or a combination thereof. Additionally or alternatively, the machine learning module 150 may comprise neural networks such as, artificial neural networks (ANN), autoencoders, probabilistic neural networks (PNN), time delay neural networks (TDNN), convolutional neural networks (CNN), deep stacking networks (DSN), radial basis function networks (RBFN), general regression neural networks (GRNN), deep belief networks (DBN), deep neural networks (DNN), deep reinforcement learning (DRL), recurrent neural networks (RNN), fully recurrent neural networks (FRNN), Hopfield networks, Boltzmann machines, deep Boltzmann machines, self-organizing maps (SOM), learning vector quantizations (LVQ), simple recurrent networks (SRN), reservoir computing, echo state networks (ESN), long short-term memory networks (LSTM), bi-directional RNNs, hierarchical RNNs, stochastic neural networks, genetic scale models, committee of machines (COM), associative neural networks (ASNN), instantaneously trained neural networks (ITNN), spiking neural networks (SNN), regulatory feedback networks, neocognitron networks, compound hierarchical-deep models, deep predictive coding networks (DPCN), multilayer kernel machines (MKM), cascade correlation networks (CCN), neuro-fuzzy networks, compositional pattern-producing networks, one-shot associative memory models, hierarchical temporal memory (HTM) models, holographic associative memory (HAM), neural Turing machines, or combination thereof.

A NN may be a hardware or a software component that includes a number of connected nodes (a.k.a., artificial neurons), which may be seen as loosely corresponding to the neurons in a human brain. Each connection, or edge, may transmit a signal from one node to another (like the physical synapses in a brain). When a node receives a signal, it can process the signal and then transmit the processed signal to other connected nodes. In some cases, the signals between nodes comprise real numbers, and the output of each node may be computed by a function of the sum of its inputs. Each node and edge may be associated with one or more node weights that determine how the signal is processed and transmitted.

During the training process, the machine learning module 150 may adjust these weights to improve the accuracy of the result (i.e., by minimizing a loss function which corresponds in some way to the difference between the current result and the target result). The weight of an edge may increase or decrease the strength of the signal transmitted between nodes. In some cases, nodes may have a threshold below which a signal is not transmitted at all. The nodes may also be aggregated into layers. Different layers may perform different transformations on their inputs. The initial layer may be known as the input layer and the last layer may be known as the output layer. In some cases, signals may traverse certain layers multiple times.

Predictive operation module 151, may use one or more of the trained machine learning models to determine the operation type, the one or more operational parameters of the machine or duration of operation. The predictive operation module 151 may automatically adjust any of the operational parameters and the duration of the operation based on the sensor readings, operational data of the machine and the trained machine learning models. A user may authorize the autonomous operation of machines. The authorization may be stored in the profile of the user. When autonomous operation is authorized, the predictive operation module 151, in coordination with the operation control module 147, may make changes to the operational parameters and duration of operation, as well as process payment of additional charges associated with the changes made without human interaction.

The facility management module 152 may comprise facility machine learning module 153, facility monitoring module 156 and attendant control module 157. The facility management module 152 may control aspects of the facility apart from the operation of the machine. Facility management module 152 may control environmental conditions, infrastructure, utilities and services provided at the facility. Additional services managed through the facility management module 152 may include folding services, dry cleaning, alterations, washing, drying or other laundry based processes.

Additional services may be added on to a user's current laundry operation. For example, if there is any interruption in the user's ability to complete a laundry operation or planned operation, the user may choose an additional service which will complete the current operation or planned operation for the user, and allow the user to return at a later time to retrieve their laundry. Fees may be associated with each step or section of the operation or planned operation that the facility performs in place of the user. For example, fees may be charged for the time required to finish, per article of clothing, the number of steps involved in the completing of the operations or combination thereof.

The entire process of separating, washing, drying, folding and hanging of clothing may be performed by an attendant at the facility. The facility management module 152 may coordinate one or more attendants, estimate the time required to complete the requested services, and notify users of the status and expected completion/pick-up time for their laundry.

Facility management module 152 may also control automated and autonomous robotic machines for loading, transferring, removing, folding and organizing of clothing. All-in-one machines may be used that incorporate ventless or ultrasonic drying functionality into the laundering process. The operation of robotic machines and interaction with human attendants may be scheduled, monitored and controlled by the facility management module.

The facility management module 152 may receive a request from a user to contact a previous user or a subsequent user of a specific machine. For example, the facility management module 152 may coordinate anonymous communication between users of a machine to aid in recovery of lost or forgotten items. For example, if a user finds a sock or other article of clothing in a washing machine or dryer, they may be allowed to send a message to the person who used the machine before them to inform them that the article of clothing was found and will be returned to an attendant or left in a specific location such as a lost and found bin. Alternatively, if a person who has used the machine realizes after leaving the facility that they have forgotten something, they may send a message to the next user in an attempt to recover the forgotten item.

The extra services may be requested on the fly, at any point during the user's laundry session. The extra services may also include full service, including receiving the clothing from the user. The retrieving of the clothing from the user may be performed inside the facility, at designated pickup locations, curbside, or through a delivery or rideshare service.

In one embodiment, a facility or group of facilities may partner with ridesharing or food delivery platforms to arrange for laundry to be picked up at a user's home and dropped off at a facility to be serviced. The facility chosen to receive the laundry may be based on current usage of the facility, amount of unused capacity, distance, types of service provided at the facility and pick-up/drop-off preference. The user may request home pickup, curbside drop-off or in-facility drop-off for delivering the laundry to the facility. The user may request home delivery, curbside pick-up or in facility pick-up for retrieving their clothes. Any combination of laundry delivery and retrieval may be requested by the user.

Facility management module 152 may provide the user with a tracked status of the operations and services being performed on their laundry. The user may be sent notifications of completion of different laundry operations as well as upon completion of the requested service. The user may, at any time after the completion of the requested services, submit a request to retrieve their laundry. The user may want to wait until a time that is convenient for them to request that their laundry be delivered to their place of residence, office, or any other location that the user wishes. The user may also designate a person other than themselves to receive or pick-up their laundry from the facility. The designated person may provide a passphrase to the attendant or show identification that matches the name provided by the user. The designated person may also use a mobile application to provide proof of identity or authorization to retrieve the laundry. The user may also transfer control, responsibility or authorization to another user. The transfer may be received by the server from the original user and the server may update the status and ownership of the service request and the associated laundry loads to the new user. The facility management module 152 may then be informed of the transfer and the service request and associated laundry may then be picked up by the newly responsible user.

The facility management module 152 may also be used to manage and control the storage of laundry. Users that have requested and paid for additional services may require their clothing to be stored securely at the facility until the user can retrieve the clothing or the clothing can be picked up and transported to the user at a specified time. The facility management module 152 may designate an available machine as a storage space for a user's laundry and control the locking mechanism to secure the machine until retrieval can be scheduled. The facility management module may suggest or automatically assign a machine to be used for storage based on facility usage and specific machine usage data. Machines that are in less demand at the facility may be preferred over other machines, and therefore be ranked higher on a list of machines to be used for storage purposes. The ranking, score or priority of a machine may be influence by the revenue generated from the machine, the cost of operating the machine, energy efficiency of the machine, preferences, patterns and habits of regular (repeat) customers and scheduled maintenance and repair of machines.

The Facility machine learning module 153 may be used to analyze the usage and operation of the machines and the usage of the facility as a whole. Machine, facility, user, environmental and geo-contextually relevant information, including hyperlocal events (e.g. parades, local holiday celebration) and conditions (e.g. extreme weather events, pandemic, fires, just really cold), both current and historic, may be used in the training of machine learning models and models for the analysis and prediction of machine usage, failure, maintenance, efficiency, profitability or combination thereof.

Predictive maintenance module 154 may use a trained machine learning model generated by the facility machine learning module 153 to predict possible faults or failures of the machines or other equipment in the facility. Information from each machine, including current and historic sensor readings, are analyzed by the predictive maintenance module 154. The predictive maintenance module may continually analyze time-series data corresponding to the machines in the facility. Trends over time may be recognized and root causes may be identified by the predictive maintenance module 154. The training of the machine learning modules used in the predictive maintenance module may be supervised, unsupervised, semi supervised or adapted from another domain. Synthetic training data may be used to bootstrap a learning model, and then refined on actual sensor data. The datastore module 141 may store all data resulting from the operation of the facility and each machine. Time-series analysis may be performed on operational data from a machine for a predefined time window or from the beginning of the historical data. Each operation session may also be used as a chronological representation of the machines health as a whole to identify possible maintenance needs.

Predictive maintenance module 154 may train and use a machine learning model based on maintenance and repair logs. For every fault or failure of a part, there may be a repair, maintenance, or replacement event associated with it. Fault events may be caused by the fault or failure of one or more parts. The level of failure may be different for each of the parts causing the fault event. For each fault event, data from machine sensors, for a time period leading up to the fault event may be analyzed. The machine learning model may be trained on the sensor readings for the time period leading up to the fault event, and the labeling of the classification of the parts that caused the fault event may be based on the repair, maintenance and replacement logs. In effect, creating datasets of labeled training data for use in the training of one or more machine learning models. A second dataset comprising the fault events including sensor readings for a period of time leading up to the fault event, and a period of time after the event may be used in the training of one or more machine learning models. The predictive maintenance module 154 may use the second dataset to train a second machine learning model. The second machine learning model may be configured to evaluate how successful the maintenance, repair or replacement was.

Facility monitoring module 156 may be used to retrieve operational data from each machine. The retrieved data may be preprocessed by the facility monitoring module 156 to create a time-series object of the machines operation session. These objects may be provided to the predictive maintenance module 154 for analysis.

Attendant control module 157 may allow an attendant at a facility to control the operation of machines. The user control of the machines may be transferred to an attendant or if the situation demands, control may be overridden by the attendant. The attendant may be provided with the authorization to lock, unlock, start and stop machines. The attendant control module 157 may also be used to track the operations performed by the attendant. For example, the attendant may be requested to perform a service for a user not at the facility, and the attendant control module 157 may allow the attendant to control the machines as if they are the user. The responsibilities of the user may be transferred to the attendant, so that the attendant may complete the laundry operations as a proxy for the user. The attendant control module 157 may keep track of the status of the operations and services requested and being performed by the attendant. The status of the attendant and the user's laundry may be updated continually during the servicing requested by the user and carried out by the attendant. An update to the current status of the laundry operation and service request may be provided to the server 110 from attendant control module 157. The status may also be updated on the user interface on the client device 105.

Scheduling module 155 may be used to learn usage patterns and predict future usage of the machines and the facility. The machine learning module may use historic usage information and customer usage information to train a machine learning model for predicting usage and capacity of the facility at a time in the future. The projections and predictions may be used by the scheduling module 155 to schedule or plan events at the facility. For example, maintenance for a machine may be scheduled based on the predicted revenue loss due to the downtime. The scheduling module 155 may also be configured prioritize profits, prolong the life of machines, reduce energy demand or to meet future goals. The scheduling module 155 may make different scheduling decisions based on when profits are to be realized. Scheduling strategy may be different for short term versus long term profits.

Scheduling module 155 may also be used by the facility management module 152 to predict times of excess capacity. The predicted excess capacity may then be used for the processing of requested additional services. Additional services that are not time sensitive may be scheduled based on the predicted facility usage, capacity and estimated cost benefit. The cost benefit for scheduling a machine for overflow or non-time sensitive services may be based on the estimated cost of electricity for using the machine in that time slot, and the likelihood that no revenue would be lost by exhausting the capacity of the facility. For example, a facility would ideally be operating at full capacity (all machines in use at all times). However, operation at full capacity is difficult to achieve, and usage of facilities fluctuate day to day and hour to hour. Being able to predict the amount of excess capacity (number of available machines) ahead of time allows the scheduling module 155, to utilize the machines that would usually remain unused. When using the excess capacity in this way increases the profitability of the facility and the revenue per machine. The scheduling module 155 may be configured to take into consideration the risk of occupying a machine that becomes needed versus the being left unused. In the case of overflow or low priority additional service laundry, the fees charged for processing of that laundry may be lower than higher priority added service laundry, or the fees normally charged to a person using that machine. If the lower fee laundry is used in the machine and a normal fee user is unable to use the machine, the difference in the fees for that machine plus the additional machines needed to complete the user's laundry session (wash/dry of one or more loads) may be too much of a risk to take. The higher the probability that a situation like that might happen, the less attractive the scheduling of that time slot would be. There may be a threshold, beyond which, scheduling a lower fee operation outweighs the risk of losing the revenue associated with laundry session.

Scheduling module 155 may also be used to determine dynamic pricing of machine operation. During high demand, a premium may be charged for the use of the machines. The cost of operation of the machines may be based at least partly on the number of available machines, wait times for machines, number of users on a waitlist or queued for machines, the current cost of electricity (electricity costs can double between peak and off-peak times).

The scheduling module 155 may also set a discounted fee at times of low usage. The fees for each day may be determined ahead of time. For example, the scheduling module 155 may predict the usage of the facility and machines for the coming week and set the fees for the machines based on the predicted usage. At predicted peak times, the fee may be high, and at the slow/off-peak times, the fee would be reduced. The machine learning module may be used to train a model to predict the change in usage based on the change in fee. Fees can therefore be adjusted to maximize revenue/profits, and spread out the usage more evenly throughout the day. This may allow for a facility to operate at closer to full capacity than it otherwise could.

Figure 1C:
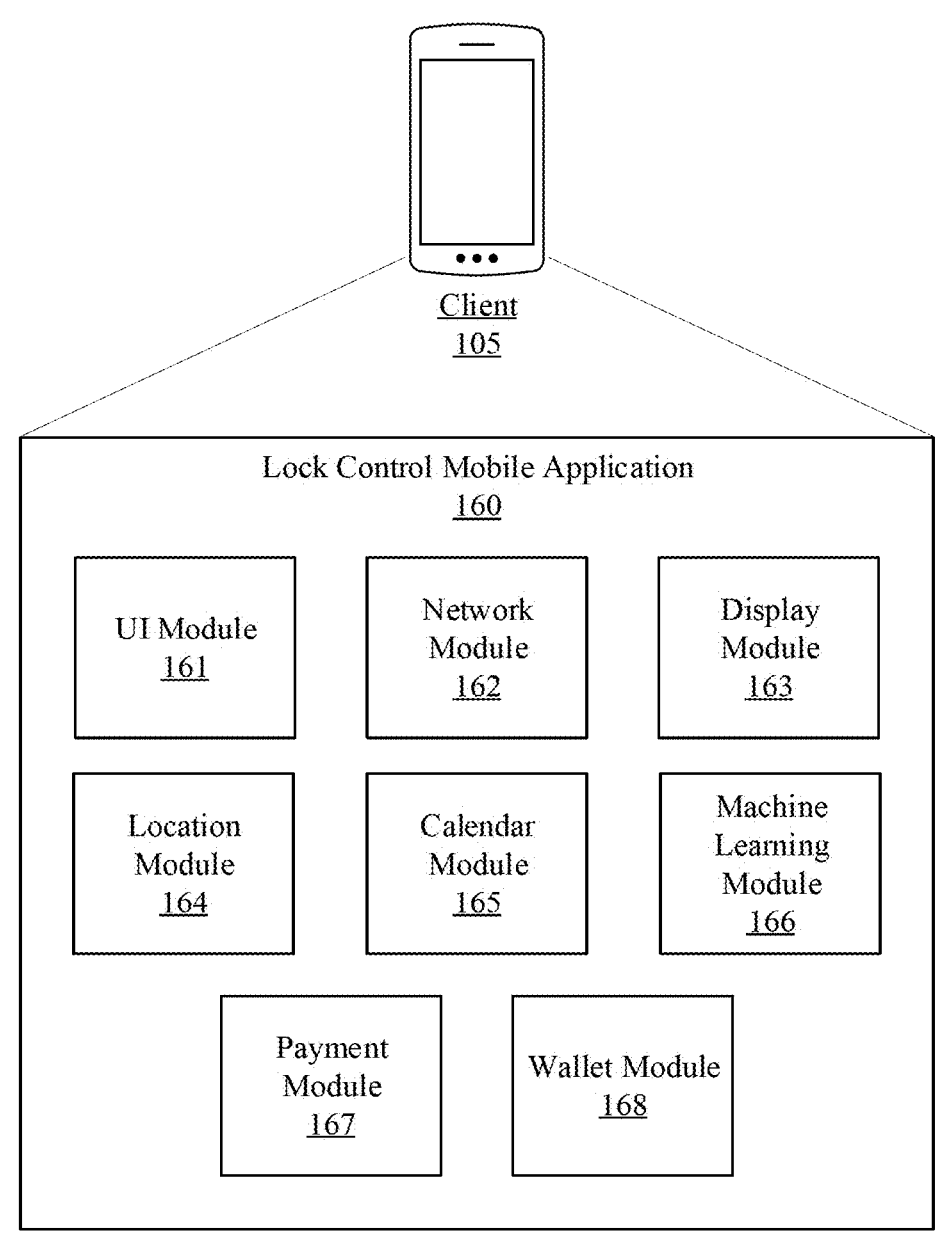
FIG. 1C is a diagram illustrating an exemplary client device in accordance with aspects of the present disclosure.

FIG. 1C is a diagram illustrating an exemplary client device 105, in accordance with aspects of the present disclosure. Lock control mobile application 160 may operate on client device 105 and comprise UI module 161, network module 162, display module 163, location module 164, calendar module 165, machine learning module 166, payment module 167 and wallet module 168.

UI module 161 may generate a user interface to allow the user to control all aspects of their laundry session. UI module 161 may send and receive information from the network module 162, location module 164, Calendar module 165, machine learning module 166, payment module 167 and wallet module 168. The UI module 161 may receive facility and machine information through network module 162. The facility and machine information may be used by the UI module to display a list of available and unavailable machines. The machines in the list may be selectable. Information regarding current operations being performed by the machines may be displayed to the user. The UI may display operational parameters to be selected by the user and associated to a selected machine. The UI module 161 send selections from the user, to the server 110. The selections and requests generated by the user in the UI module 161 may be sent to the machine itself, through the server or directly. Information displayed on the interface may be updated based on selections made on the machine itself. The UI module 161 may be used to trigger lock and unlock functions at the machine, engaging and disengaging a locking mechanism. UI module may be in communication with display module 163, allowing the display module to render the interface on the device.

Network module 162 may transmit and receive data from other computing systems via a network. In some embodiments, the network module 162 may enable transmitting and receiving data from the Internet. Data received by the network module 162 may be used by the other modules. The modules may transmit data through the network module 162. Network module 162 may also comprise circuitry configured to enable communication through WIFI, Bluetooth, Bluetooth low energy, 3G/4G/5G telecommunications networks or any other communication standard.

Display module 163 may be a touch-screen display, a head-up display, a head-mounted display, an optical see-through display, an optical see-around display, a video see-through display, a flat-panel display, a light-emitting diode (LED) display, an electroluminescent display (ELD), an electrophoretic display (EPD or electronic paper), a liquid crystal display (LCD), an organic LED (OLED) display, an active-matrix organic light-emitting diode display or any other type of display.

Location module 164 may comprise a GPS module. The GPS module may include circuitry configured to receive geolocation and time information from the global navigation satellite system (GNSS). The location module 164 may use the GPS module to accurately estimate the client device location when there is an unobstructed line of sight between the GPS module and four or more GPS satellites. Location module 164 may also determine location of the client device 105 based on triangulation of signals broadcast from/to the client device 105, from/to known locations of three or more transceivers. The location module 164 may allow the user to manually select from a map or enter the user's current or desired location. The determined or user entered location may be used in the displaying of available laundry facilities, either in a list or on a map.

Calendar module 165 may be used to plan recommend times and days that would be the most convenient or cheapest for a user to use the facility. The calendar module 165 may also be used in the scheduling of pick-up and drop-off of laundry for servicing at the laundry facility or scheduling home pick-up and/or home delivery of a user's laundry. Laundry home delivery may be automatically scheduled based on the user's calendar. The calendar module 165 may also provide machine learning module 166 with information regarding the user's future and past behaviors, actions and events. Calendar module 165 may use one or more machine learning models generated by the machine learning module 166 to make recommendations and schedule laundry services automatically.

Machine learning module 166 may be trained in a similar manner to the above mentioned machine learning modules, and may have access to all the same historic data. Machine learning module 166 may use the additional personal information available to the user to provide recommendations or notifications to the user. Based on past usage information for the user, the machine learning module may be trained to identify patterns of use and preferences. For example, a user may be notified when their favorite machine is available, or that a machine used for a specific load has become or will become available. For example, the machine learning module may learn that a user washes their duvet once a month, and that the machines large enough to wash the duvet are rarely available, a notification may be provided to the user once a machine becomes available. The model may predict a time that one of the desired machines will be available based on the facility usage. The prediction and notification may be generated based on analyzing the user's usage data and recognizing that the user has not washed the duvet in accordance with the user's normal routine.

Machine learning module 166 may also be used in generating a plan for sequential operation of machine. For example, the machine learning module 166 may determine an optimal combination of machines to use, the settings to use on the machines, the duration of the operations and the timing of the start of each machine. The determination may be based on user preferences, such as lowest cost, soonest completion time and lowest energy usage. The operational profile of each machine may be analyzed alone and in combination with other available machine or machines scheduled to become available to determine the optimal machine sequence recommendation.

The machine sequence recommendation may include the sequential and/or simultaneous operation of multiple machines. The starting and ending of the multiple machines may be staggered, taking into consideration time to load into the next machine and unloading of the current machine. For example, the user may start multiple machines at any time during the laundry session. The machine learning module 166 may recommend the number of dryers to use based on the washer load. The recommendation may also be based on the time required to dry the clothes, lowest cost to dry the clothes, or most energy efficient number of dryers to dry the clothes. The user may choose, on their user profile or in the user interface, to prioritize energy savings over cost or speed, and a machine usage plan may be suggested for a combination of washers and dryers with specific settings for each that optimizes the energy efficiency of the overall laundry session. The plan may include recommended operation start times on each machine and the order of operation that should be followed. For example, to increase energy efficiency, a plan may be suggested that includes using a single washing machine at a specific time, and upon completion of the wash cycle drying the clothing in batches using a single dryer. This would allow the heat that has been built up inside the drum to aid in the drying of the next load. A user may provide information relating to the laundry they plan to wash before beginning the wash. By providing this information, the system may be able to plan the most efficient (time and energy) use or the available machines to wash/dry all of the user's laundry. When a user needs to wash multiple loads, such as towels, linens, delicates or any other kind of laundry that requires different machine options to be used, the order and timing in which the loads are washed and dried becomes more important. Similar machine usage plans may be suggested for cost and speed.

Payment module 167 may operate in the same way as payment module 142 on server 110. Processed payments from either payment module may be added to wallet module 168. The wallet module 168 may store prepaid credits that may be used to pay for the operation of washing machines 115 and dryers 120.

Figure 1D:
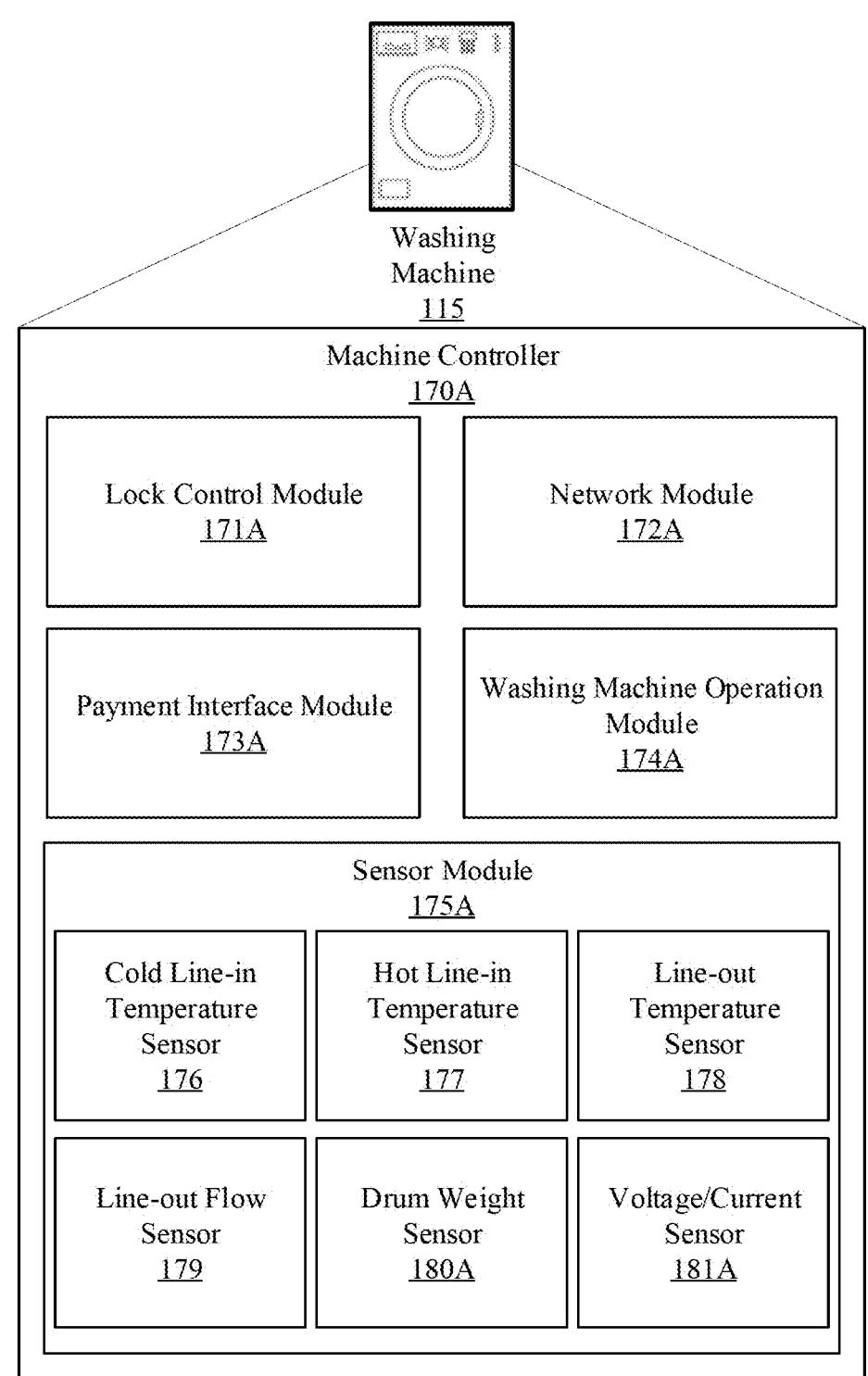
FIG. 1D is a diagram illustrating an exemplary machine controller in accordance with aspects of the present disclosure.

FIG. 1D is a diagram illustrating an exemplary machine controller 170A installed in a washing machine 115, in accordance with aspects of the present disclosure. Machine controller 170A may comprise lock control module 171A, network module 172A, payment interface module 173A, washing machine operation module 174A and sensor module 175A. The network module 172A may be similar to that described with regard to FIGS. 1B and 1C.

lock control module 171A may control the engagement and disengagement of a locking mechanism on the machine door. The lock may be an electromagnetic lock configured to secure the door of the machine, such that unauthorized users are unable to open the machine. The lock may only be toggles on or off by the lock control module 171A. The lock control module 171A may receive a request to lock/unlock the locking mechanism from the server as a result of the user making a selection and generating the request from the interface on the client device 105. and the lock control module 171A.

Payment interface module 173A may receive a signal from the operation control module 147 on server 110. The signal may be a pulsed signal representative of the amount paid by the user and to be added to the selected machine. The payment interface module 173A may be a physical or electrical interface which is configured to trigger the payment mechanism of the physical machine. For example, coin operated machines may be fitted with a payment interface module to allow for payment to be processed by payment module 142 or 167 or wallet module 168. An electric signal may be generated to trigger a pin on the physical machine to simulate a coin being deposited. The number of electric pulses to be generated may be determined by the payment interface module 173A, operation control module 147 or other modules on client 105, server 110, washing machine 115 or dryer 120 and based on the amount paid by the user. The payment interface module 173A may also comprise a mechanical component, configured to mechanically trigger a switch in the coin deposit mechanism to load money onto the machine.

Washing machine operation module 174A may be configured to receive operational parameters from the operation control module 147, and cause the machine to perform the desired functions. The washing machine operational module 174A may directly control all aspect of the machine's operation, or be an interface that relays the requests to a built-in controller for the machine.

Sensor module 175A may comprise cold line-in temperature sensor 176, hot line-in temperature sensor 177, line-out temperature sensor 178, line-out flow sensor 179, drum weight sensor 180A and voltage/current sensor 181A. Cold line-in temperature sensor 176 and hot line-in temperature sensor 177 measure the temperature of water entering the washing machine. The line-out temperature sensor 178 measures the water temperature as it is being drained from the washing machine. Line-out flow sensor 179 may measure the flow rate of water as it leaves the washing machine. Drum weight sensor 180A may be used to measure the weight of the load at multiple times during the washing cycle. The initial weight, weight during wash, weight after first draining, weight during rinse and weight after final draining may all be determined and stored for analysis. Additional readings from the drum weight sensor 180A may be taken and stored. There may be more or less stages during a washing cycle and the weight readings at the start, during and after each may be needed for analysis. Voltage/current sensor 181A may be continually read during operation of the machine. The voltage/current sensor 181A may be used to determine efficiency of the machine and to help in detecting malfunctioning machines.

For example, the predictive maintenance module 154 of server 110 may use the sensor readings to determine current and predict future drops in efficiency, malfunctions or failures. By analyzing the series of readings from the sensors, inferences may be made as to ideal readings at future times. Deviation from the expected readings may signal that there is a malfunction or failure in the machine or the sensor. Much can be determined from the readings during a single operation of a machine. For example, the weight of the laundry before the start of the operation and the weight of the laundry after the water has been added may be used to determine the volume of water added to the machine. If the determined volume of water is different than the expected volume of water, there may be a leak or there may be obstructions in the line or other issues causing a reduced flow of water on the lines into the machine. The weight may also be measured continuously. A continuous measure of weight as the washer is being filled may be used to determine a flow rate into the machine. The measured out-flow volume at the completion of the wash and rinse cycles may also be compared to the weight of the laundry during the cycle (when water is full) and after draining. The difference in weight at the two times may be used to calculate the volume of water that has been removed from the machine. If the volume of water that has been removed is more than measured by the line-out flow sensor 179, there may be a leak in the machine. Changes in water temperature may be analyzed to detect failures in insulation, or problems with the cold or hot water line before reaching the machine. The voltage/current sensor 181A may also show spikes in power drawn when the machine becomes overloaded. Over time the power usage of the machine may change for many reasons. The motor may draw more power to spin the drum than usual due to more friction caused by wear on bearings, rust or corrosion.

Figure 1E:
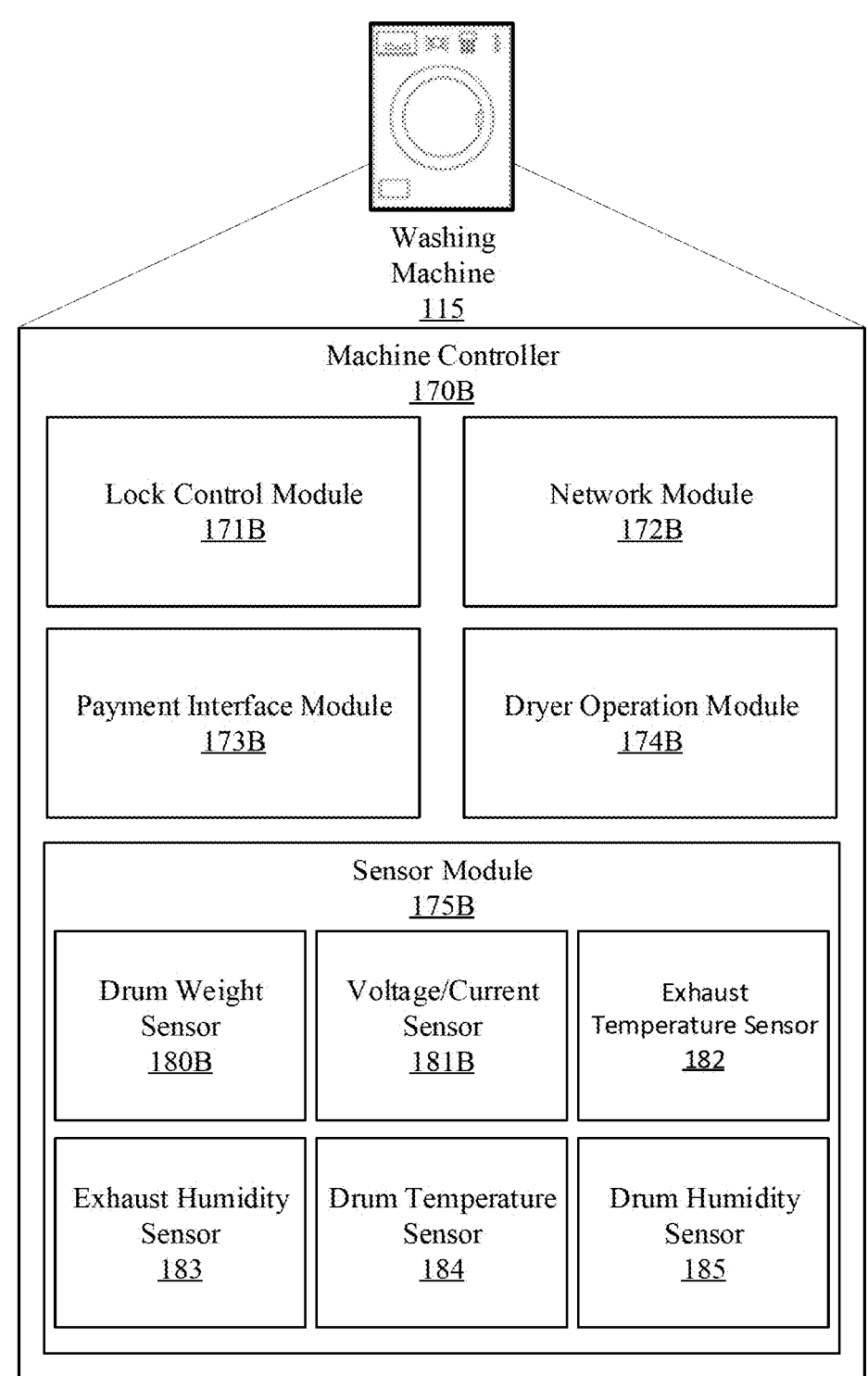
FIG. 1E is a diagram illustrating an exemplary machine controller in accordance with aspects of the present disclosure.

FIG. 1E is a diagram illustrating an exemplary machine controller 170B installed in a dryer 120, in accordance with aspects of the present disclosure. Machine controller 170B may comprise lock control module 171B, network module 172B, payment interface module 173B, washing machine operation module 174B and sensor module 175B. The network module 172B may be similar to that described with regard to FIG. 1D.

Lock control module 171B, network module 172B and payment interface module 173B may be the same or similar to that of the same components described in regard to FIG. 1D. Dryer operation module 174B may be similar to the washing machine module 174A, and perform the same function. The dryer operation module 174B may be config-ured to relay commands and operational parameters to the machine, or control the machine directly as described with regard to washing machine module 174A of FIG. 1D.

The sensor module 175B may comprise drum weight sensor 180B, voltage/current sensor 181B, exhaust temperature sensor 182, exhaust humidity sensor 183, drum temperature sensor 184 and drum humidity sensor 185. The drum weight sensor 180B and voltage/current sensor 181B are the same or similar to that described in regard to FIG. 1D. The exhaust temperature sensor 182, exhaust humidity sensor 183, drum temperature sensor 184 and drum humidity sensor 185 may all continually take readings during the operation of the dryer. Monitoring the temperature of the exhaust and the temperature of the drum, and the time required to reach those temperatures may be used by the predictive maintenance module 154 to determine how efficiently the machine is operating. Deviations from heating efficiency may require preventative maintenance to reduce the risk of failure and downtime. The heating efficiency may take into consideration the power drawn by the machine, weight of the load, temperature and humidity in the drum and temperature and humidity of the exhaust. Additional information may be used from the washing machine to estimate the amount of water still absorbed by the laundry (difference between initial laundry weight and the laundry weight as measured either at completion of the washing operation or as loaded into the dryer). The amount of water in the laundry may be calculated as a hydration percentage of weight. The hydration percentage may be used in determining a suggested duration of operation to completely dry the laundry at the desired operational parameters.

Heating efficiency may be more accurately determined, and predictions on drying times for a load may be automatically determined by incorporating the calculated hydration percentage into the calculations. For example, users may regularly try to fit their clothing into as few washing machines as possible, and then split the loads to speed up drying. Therefore, there are situation where each laud from a single washing machine is dried in two or more dryers. Each dryer may be able to calculate the exact amount of time required to dry each load by taking into consideration the hydration percentage. With no prior knowledge of the load being dried, it becomes more difficult to predict the operation time required because the amount of water that needs to be removed from the clothing is unknown. Without prior knowledge, a small load of very damp laundry and a large load of fairly dry laundry may weigh the same, but will take drastically different amounts of time to dry. When the hydration percentage is known for the laundry, a machine may more accurately estimate the amount of water present at the start of the drying operation and therefore make a more accurate prediction of operation duration.

The exhaust temperature and exhaust humidity may also be used to estimate how much water remains in the laundry and determine completion of a drying operation. Efficiency trends for a machine may be used to determine failures or malfunctions. Time to reach the desired operation temperature, how well the temperature is maintained, the maximum temperature reached, and rate of temperature drop after completion may all be analyzed to determine malfunctions or degradation of functionality.

FIG. 2A is a flow chart illustrating an exemplary method for operating and controlling a laundry machine 200 that may be performed in accordance with some embodiments.

At step 201, the system may receive a list of machines at a laundry facility. The list may be stored or accessed by the datastore module 141 of server 110. Information relating to the machines at the facility may also be retrieved, such as availability status, time remaining on unavailable machines, or other machine specific information. The list may be split into a list of available and unavailable machines, as well as machines that the user is currently operating.

At step 202, the system may display the list of machines on a machine control user interface. The user interface may be generated by the UI module 161 of client device 105 and displayed by the display module 163. The list of machines may be grouped or separated for display on the user interface. A list of available washing machines, unavailable washing machines, available dryers, unavailable dryers and machines in use by the user may all be displayed on the same or separate windows, tabs or panes of the user interface.

At step 203, the system may receive a selection of a machine, an operation type, and operational parameters. The selection may be in response to a user making a selection from the user interface on the client device 105, the user making a selection on the physical machine or combination thereof.

At step 204, the system may display, on the machine control user interface, the user selections, an estimated duration of the operation and the cost. Selection made on the machine itself may be sent to the server to update operational information for the selected machine. The server may then update the user interface on the client device 105 with the selections made on the machine. Upon making the selections, an estimated duration of the operation may be calculated or retrieved based on the operation type and operational parameters selected by the user. A cost may also be determined based on the operation type, operational parameters and in some cased the cost may also be based on a user selected amount of time.

At step 205, the system may receive payment from the user. The user may pay through credit/debit card transactions, with vouchers, gift cards or funds directly from an electronic wallet on the client device. The wallet module 168 on client device 105 may store credits or funds for use with laundry machines. The stored money may be purchased at any time or transferred between users. Payment may also be processed through payment module 167 on client device 105 or payment module 142 on server 110.

At step 206, the system may start the operation on the selected machine, wherein the user initiates the start of operation through direct interaction with the selected machine or through user input on the machine control user interface. The user may select request the initiation of the operation from the user interface on the client device 105. The server 110 may receive the request from the client device 105 through network module 140. Operation control module 147 may take the request to initiate operation of machine and relay the request as well as the payment confirmation to the machine controller 170A or 170B of the washing machine 115 or dryer 120. Machine controller 170A or 170B may then proceed to starting the operation on the selected machine.

At step 207, the system may user requests to engage the locking mechanism from the machine control user interface. The locking request may be sent from the client device 105 to the server 110. The operation control module 147 may then relay the request to the machine controller on the selected machine. The machine controller may trigger the locking mechanism based on the lock request made by the user. The lock status for the selected machine may then be updated on the server and in the user interface.

At step 208, the system may notify the user of the time remaining on the operation and give the user an option to extend the timer by making an additional payment. Notifications may be generated by the notification module 149 on server 110 and displayed to the user on the user interface of the client device 105.

At step 209, the system may notify the user that the operation has completed and that the user has a predetermined amount of time to unlock the machine before being charged a fee. A timer may be started on the server at the time of completion.

At step 210, the system may charge a fee if the locking mechanism is still engaged after the predetermined amount of time.

FIG. 2B is a flow chart illustrating additional steps 220 that may be performed in accordance with some embodiments.

At step 221, the system may receive, on the server, a payment amount from the user equal to the cost of the operation to be performed. The payment may be processed by payment module 142 on server 110 or payment module 167 or wallet module 168 on the client device.

At step 222, the system may change, on the server, a status of the selected machine from available to unavailable.

At step 223, the system may update the status of the selected machine on the machine control user interface.

At step 224, the system may initiate a timer associated with an operation to be performed on the selected machine, wherein the timer tracks the amount of time remaining until completion of the operation.

At step 225, the system may send, from the server, a payment confirmation to the machine controller, wherein the payment confirmation comprises the payment amount.

At step 226, the system may generate, by the machine controller, a signal representative of the payment amount.

At step 227, the system may receive, at a pay interface, the generated signal, wherein the signal is pulsed and triggers the payment interface a number of times based on the payment amount.

At step 228, the system may start the operation on the selected machine, wherein the user initiates the start of operation through direct interaction with the selected machine or through user input on the machine control user interface.

FIG. 2C is a flow chart illustrating additional steps in the controlling of the locking mechanism of the laundry machine 230 that may be performed in accordance with some embodiments.

At step 231, the system may display, to a user, a machine control user interface, operating on a user device, configured to control a selected machine in a laundry facility that is currently being operated by the user.

At step 232, the system may receive, from the user, a selection on the machine control user interface, wherein the selection is to engage a locking mechanism on selected machine.

At step 233, the system may transmit a request to engage the locking mechanism from the user device to the server.

At step 234, the system may receive, at the server, the request to engage the locking mechanism.

At step 235, the system may send, to a machine controller of the selected machine, the request to engage the locking mechanism from the server.

At step 236, the system may engage the locking mechanism.

At step 237, the system may update a lock status of the selected machine on the server and the machine control user interface on client device.

At step 238, the system may notify the user that the operation has completed and that the user has a predetermined amount of time to unlock the machine before being charged a fee.

At step 239, the system may receive, from the user, a selection on the machine control user interface to disengage the locking mechanism.

At step 240, the system may transmit a request to disengage the locking mechanism from the user device to the server.

At step 241, the system may receive, at the server, the request to disengage the locking mechanism.

At step 242, the server may send the request to disengage the locking mechanism to the machine controller of the selected machine.

At step 243, the system may disengage the locking mechanism.

At step 244, the system may update the lock status of the selected machine on the server and the machine control user interface on client device.

At step 245, the system may determine if the user unlocked the machine within the predetermined amount of time, and if not, charge a fee to the user.

Figure 3A:
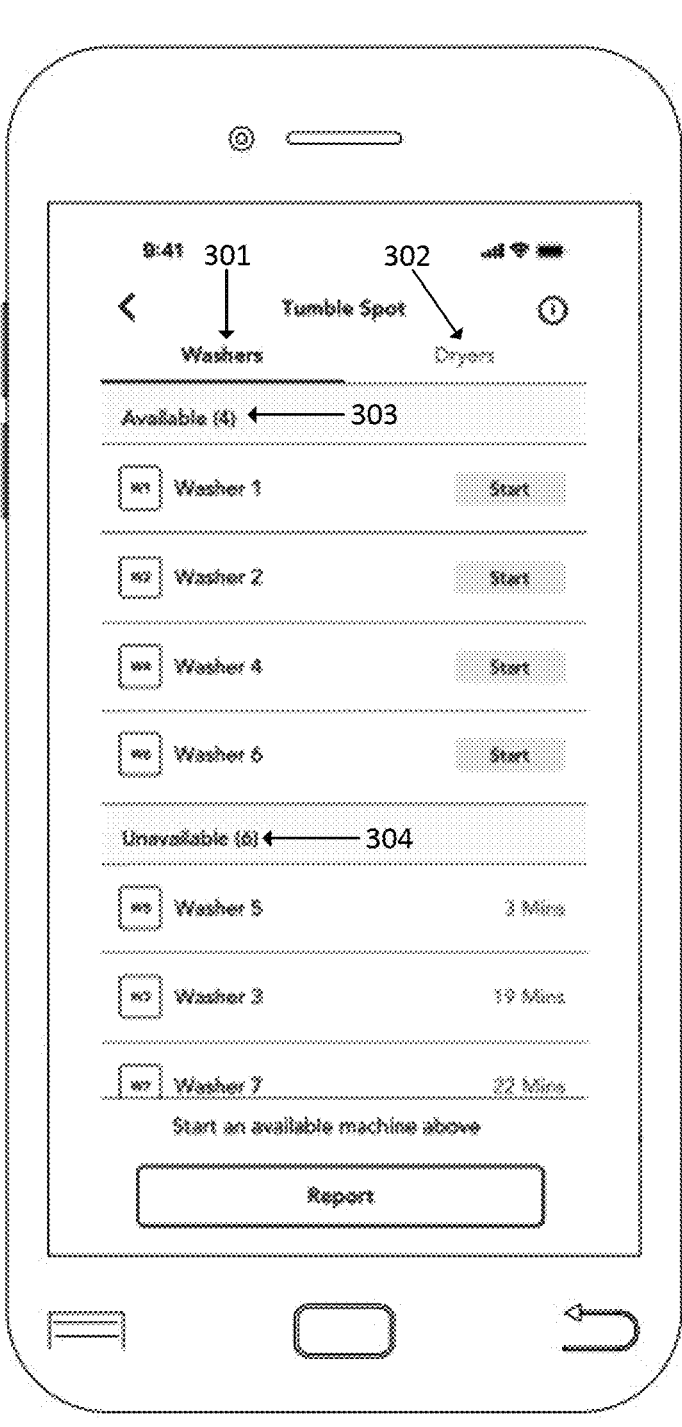
FIG. 3A shows an example interface of a lock control mobile application in accordance with some aspects of the systems and methods herein.

FIG. 3A shows an example interface of a lock control mobile application 300 in accordance with some aspects of the systems and methods herein. Lock control mobile application interface 300 may be generated by the UI module 161 on client device 105. Interface 300 may display a selection for type of machine, such as the washers tab 301 and dryers tab 302. Either the washers tab 301 or dryers tab 302 may be displayed by default. When the washers tab 301 is the currently selected tab, the interface 300 may display a listing of available machines 303 and unavailable machines. The user may select any of the available washers listed. Selection of the washer may be made by touching, clicking, tapping or otherwise performing a gesture corresponding to a selection. The interface may provide a selection button proximate to or related in some way to each available machine in the list. For example, in FIG. 3A, each available machine in the list has a "Start" button associated with the machine. The list of unavailable machines 304 may provide information related to each machine in the list. The information displayed may include time remaining, status of the machine, type of machine, capacity of machine or characteristics of the machine. Characteristics of the machine may include efficiency ratings of machines, historical speed of completion, consistency of operation, age of the machine, time since last repair or maintenance, or other information that a user may wish to consider when choosing a machine. A user may wish to select a machine which is more energy efficient to reduce their carbon footprint. A user may also wish to choose a machine that is consistent in operations over one that fluctuates during operations. For example, if a user needs to wash a load of delicates or a load of colored clothes that fade or bleed easily, the user may wish to select a machine which maintains a steady and precise washing temperature throughout the wash cycle. If a user wants to wash linens, towels or perform allergen/sanitation washes, the user may wish to choose a machine which achieves the highest temperature possible and for the longest period of time. Some washing machines may have varying temperatures throughout operation, as well as achieving different temperatures for the same operation type and selected parameters of the operation cycle.

For example, some machines may achieve higher temperatures for a hot wash than others due to variables such as capacity, age, insulation, distance from the hot water source, environmental temperature in the location of the machine or other environmental or internal variables. A medium or low temperature washing mode may be desired by the user, and each machine may operate at a different temperature for the same washing mode. This may be because of flow issues from the hot or cold lines in, resulting in a hotter or colder temperature of the water when mixed in the machine. The same variables that effect the maximum temperature of the machine may affect the warm and cold wash cycles as well.

The interface 300, may display such information as described above, for both available and unavailable machines, to allow a user to make a more informed decision about which machine to use. For example, a user may not wish to use any of the available machines and choose to wait for a specific machine in the unavailable list because the unavailable machine matches the user's desired specifications for their specific load of laundry.

Figure 3B:
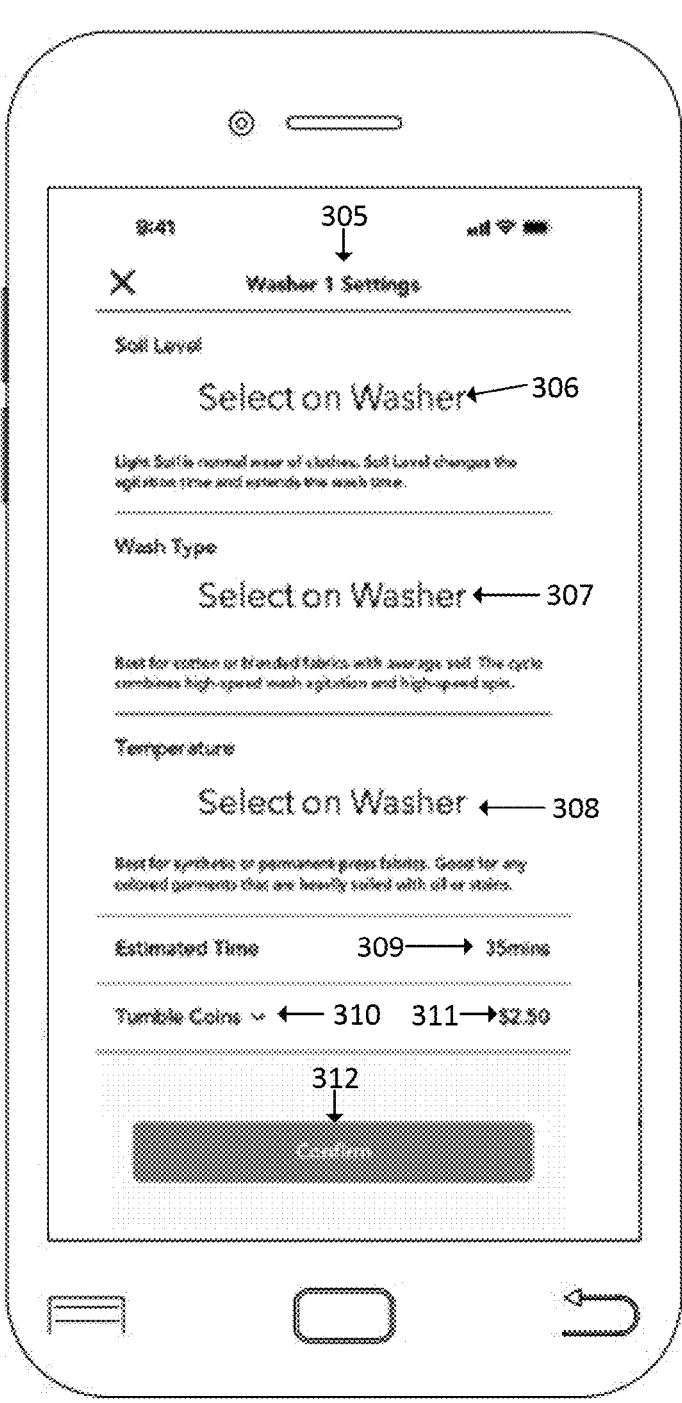
FIG. 3B shows an example interface of a lock control mobile application in accordance with some aspects of the systems and methods herein.

FIG. 3B shows the interface 300 after the selection of an available machine from the list of available machines 303. After selection of a machine, machine settings 305 may be displayed to the user. The settings may be automatically populated, selected by the user on the interface, or provided from selections made on the physical machine. The selection made on the machine itself may be displayed and updated on the interface 300. The machine may transmit information relating to the physical/manual selections made by the user to the server 110 and client device 105.

The user may choose operation type, operation parameters and addition options associated with the operation type, parameters or machine itself. As shown on FIG. 3B, the interface provides a soil level selection 306, a wash type selection 307 and a temperature selection 308. The temperature selection may be limited to a discrete set of temperature settings, such as cold, warm, hot, or other levels desired for specific washing operations. The temperature selection may also be a continuous value, capable of being set to an exact temperature desired by the user. The choice of temperature may be based on the machine itself. Some machines only allow for preprogrammed temperature settings to be user, while some allow for more user control of the temperature settings.

A user may wish to control the temperature of the washing operation even on machines with preset/preprogrammed temperature settings. In some embodiments, the system may control the operation of these machine to achieve the desired temperature. In some embodiments, sensors may be used to detect the operating temperature of the machine. Temperature readings from the hot water and cold water lines may be used to determine the volume of water from each to achieve the selected temperature. The system may operate the machine in a number of ways to reach the desired result.

In one embodiment, the machine may be triggered to switch between the hot, warm and cold temperature settings while filling the machine with water to reach the desired temperature. In one embodiment, the machine may be set to a warm setting, or any other setting that opens both the hot and cold water lines into the machine. The flow into the machine may be adjusted for each of the water lines, outside of the machine, eliminating a need to perform any changes to the machine itself. Alternatively, the temperature at the hot or cold water in sources may be changed to deliver a desired temperature. In some embodiments, the cold or hot setting may be selected on the machine, where only a single source of water is used during the cycle, and the water supplied to the machine may be adjusted before reaching the machine.

Upon selection of the soil level 306, wash type 307 and temperature 308, the user may be provided with an estimated duration 309 of the operation, and a cost 311 associated with the selections. The user may choose a funding source 310 to pay for the cost 311. The source may be an electronic wallet storing value within the application, client device, server or distributed ledger (blockchain). The money may be pre-loaded into the electric wallet and used for the purchase without needing to externally process a financial transaction. The funding source 310 may also be a gift card, promotional voucher, debit/credit card, or other accounts linked to financial institutions. Upon completing the selection of options and selecting a funding source, the user may select the confirm button 312.

Figure 3C:
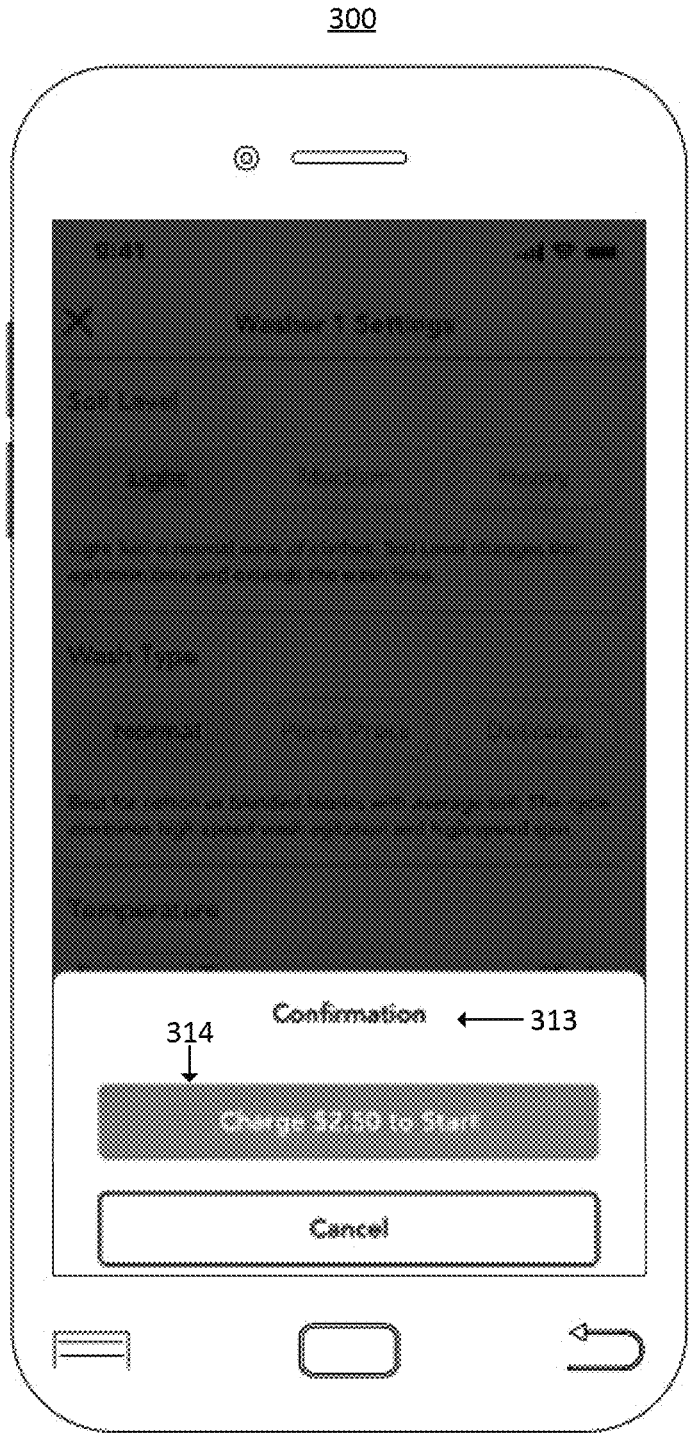
FIG. 3C shows an example interface of a lock control mobile application in accordance with some aspects of the systems and methods herein.
Figure 3D:
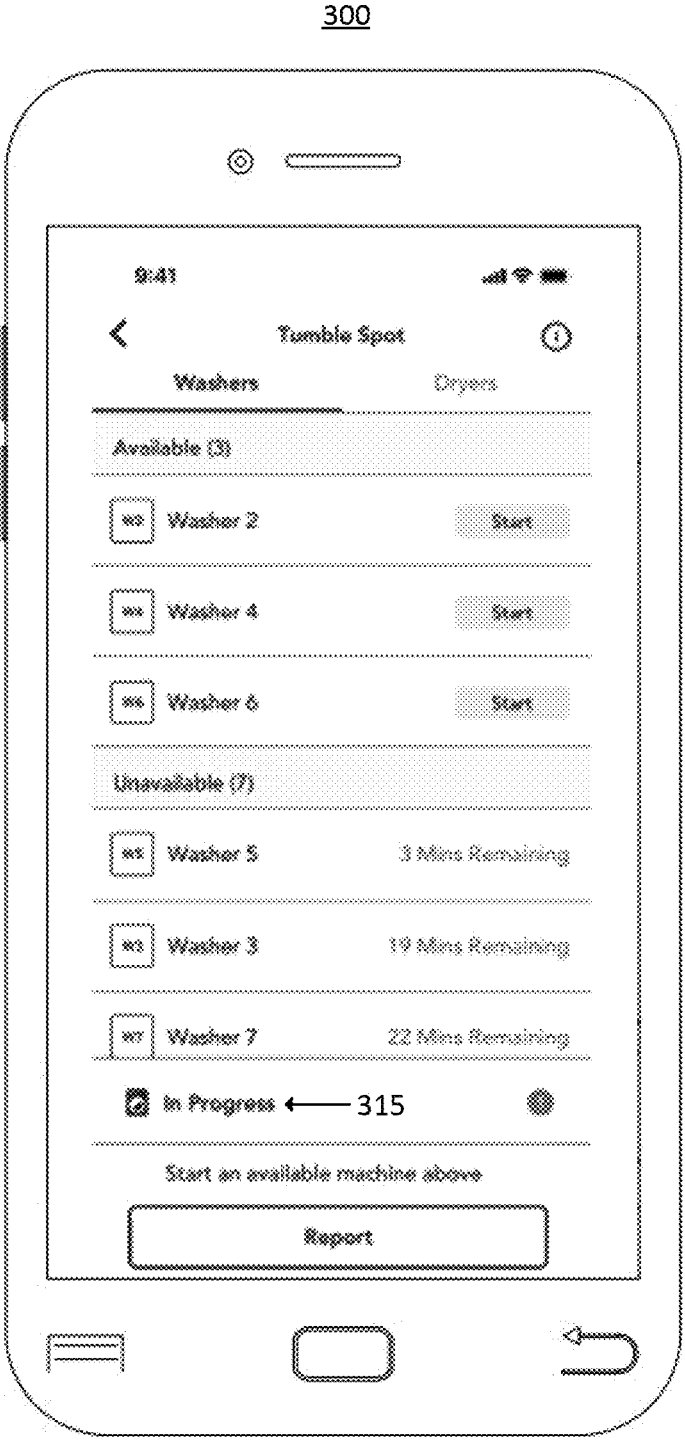
FIG. 3D shows an example interface of a lock control mobile application in accordance with some aspects of the systems and methods herein.
Figure 3E:
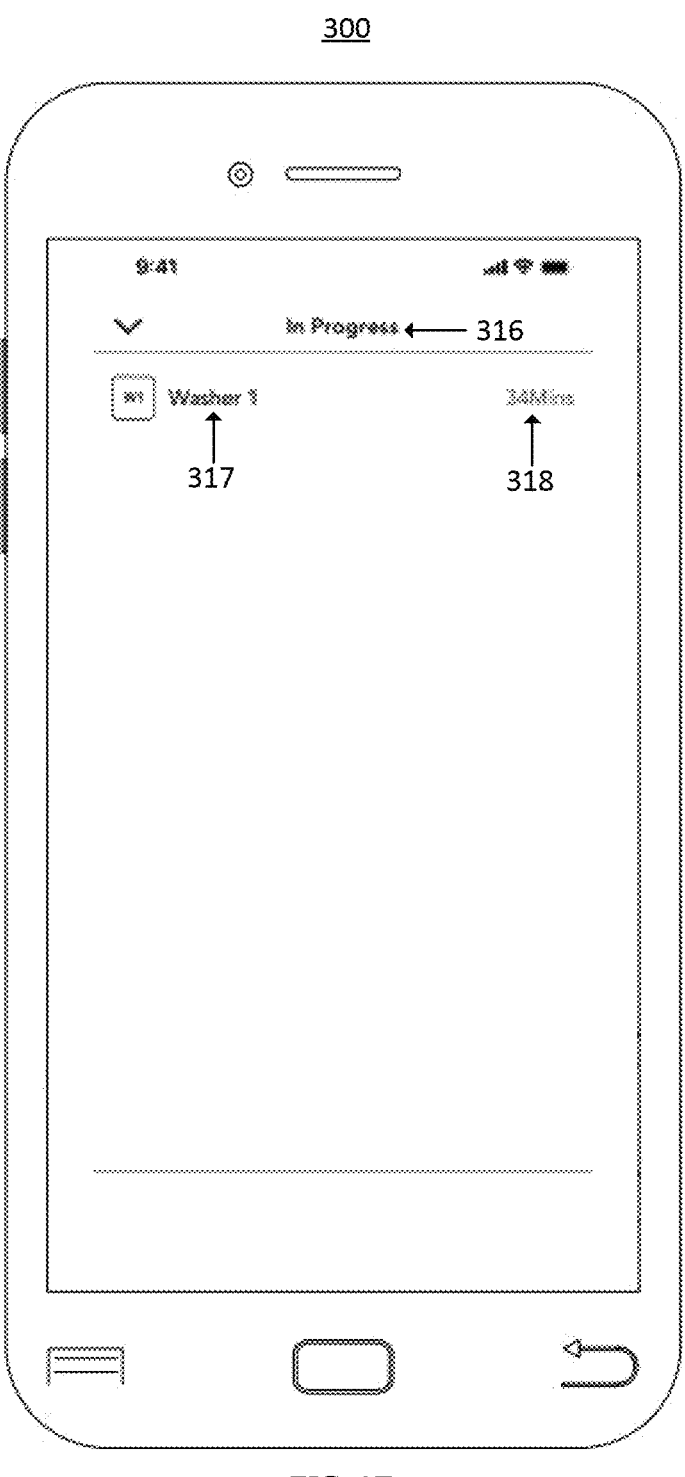
FIG. 3E shows an example interface of a lock control mobile application in accordance with some aspects of the systems and methods herein.

After the selection of the confirm button 312, a confirmation window 313 may be displayed to the user, as shown in FIG. 3C. The confirmation window 313 may provide the user with an option to pay and start 314 the machine, or cancel the selection. In FIG. 3D, after the selection of the pay and start 314 button, the machine is started and the progress 315 of the selected machine operation is displayed to the user.

Figure 3F:
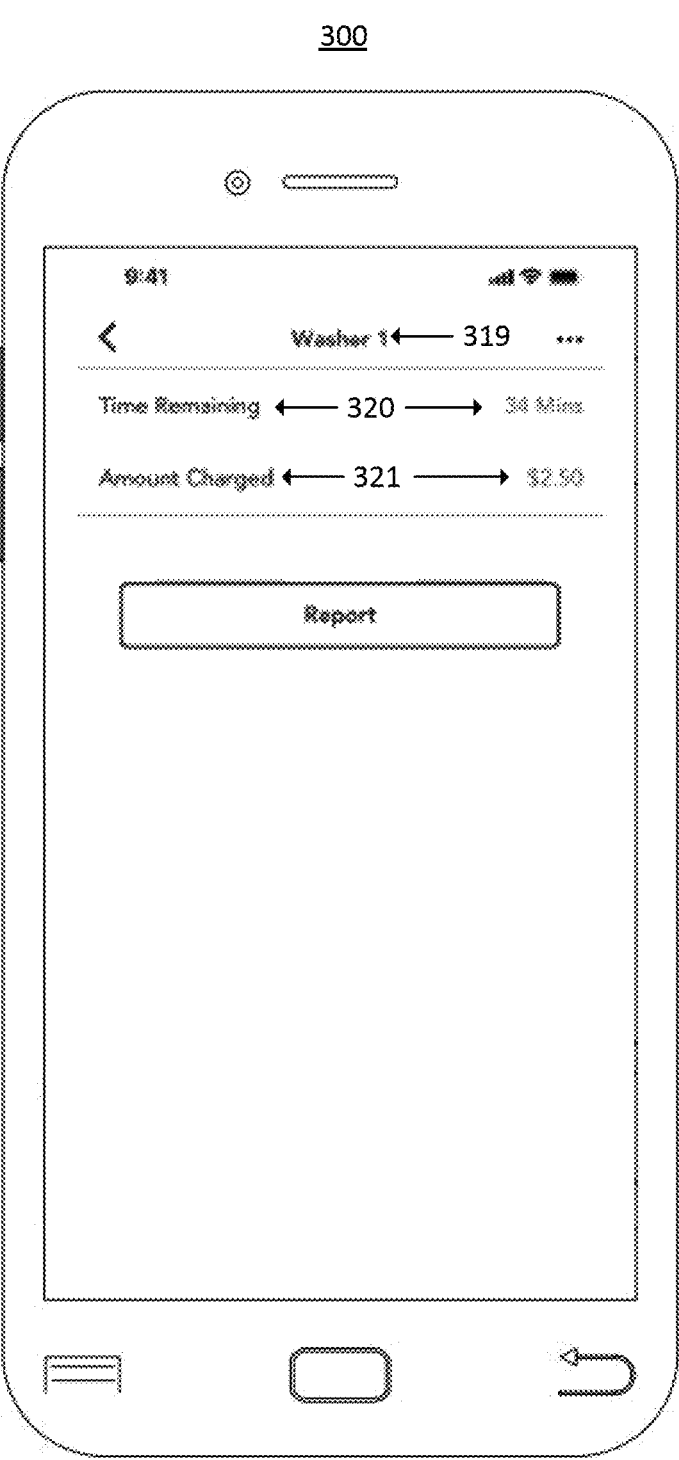
FIG. 3F shows an example interface of a lock control mobile application in accordance with some aspects of the systems and methods herein.

FIG. 3D shows an example of an in progress window 316. The user may select the progress 315 displayed on FIG. 3C to view the in progress window 316. A list of machines currently being operated 317 by the user may be listed in this window. Information relating to the operation and status of each machine may be displayed alongside the listed machines. This machine operation and status 318 may include any operational details corresponding to the specific machine. The user may select any machine listed on the in progress window 316 to see additional details for the selected machine. FIG. 3F shows a machine details window 319 which may display information relating to the operation being performed on the machine or information relating to the machine itself. As shown in FIG. 3F, information relating to the operation such as time remaining 320 and amount charged 321 may be displayed.

Figure 3G:
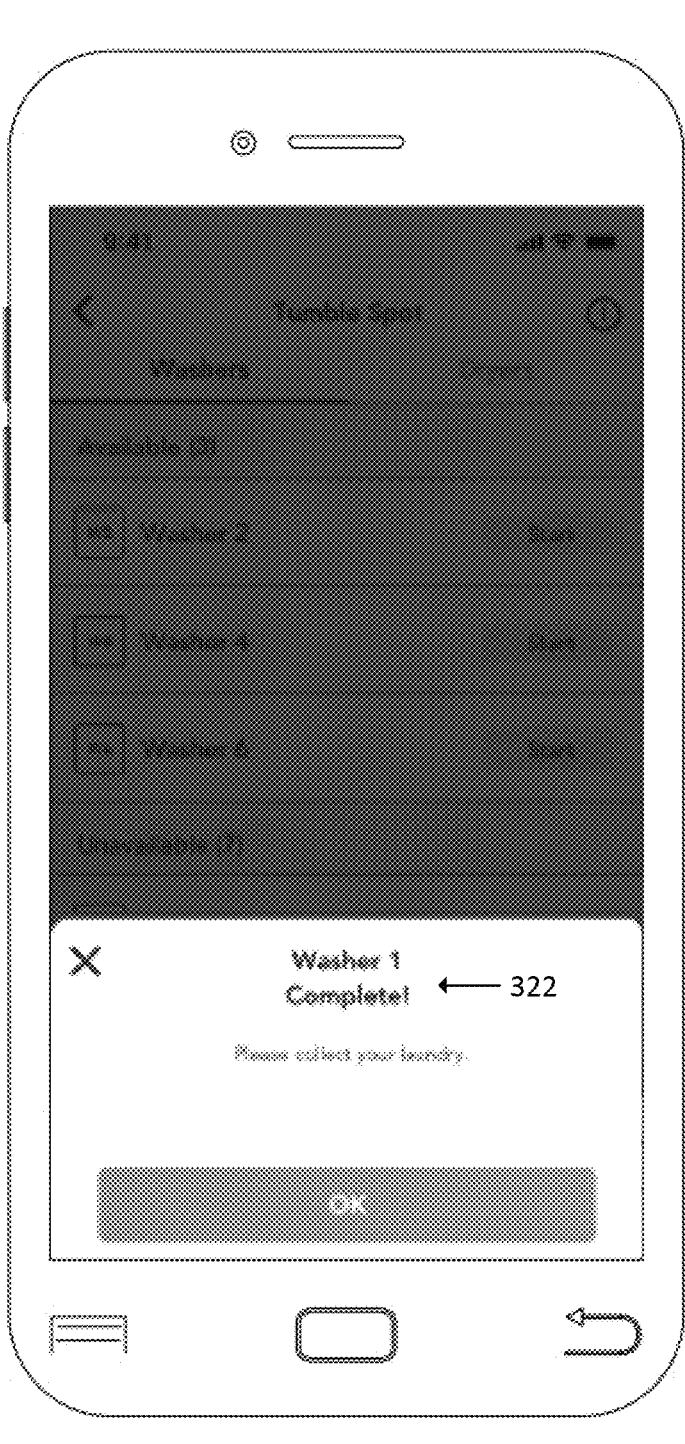
FIG. 3G shows an example interface of a lock control mobile application in accordance with some aspects of the systems and methods herein.

FIG. 3G shows an example notification displayed to the user after the completion of the machine operation. A user may receive a notification 322, informing the user that the operation has finished. Notification 322 may also be generated at a predetermined time before the completion of the operation, such as a 5 minute warning. The predetermined time, may also be set by the user. For example, if a user is going to be away from the laundry facility during operation of the machines, they may set the notification time to a level that will allow the user to return to the facility at or around the time of the completion. The notification timing may also be based on the location of the user. The system may receive and/track the location of the user and estimate an amount of time it will take for them to return to the facility, and set the notification to be sent based on that estimate. The notification may also provide a map or link to a map with a path or route form the user's current location to the facility that will allow them to return at the time the of completion.

Figure 4A:
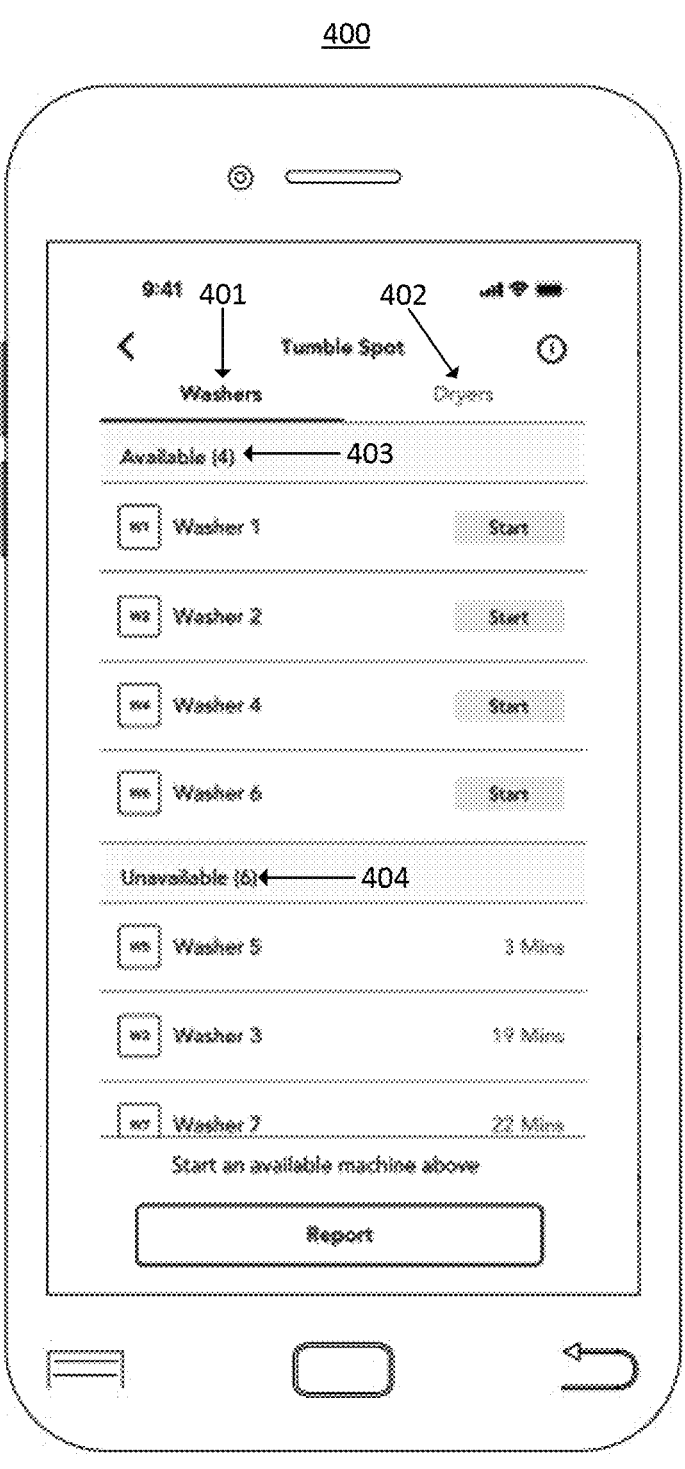
FIG. 4A shows an example interface of a lock control mobile application in accordance with some aspects of the systems and methods herein.

FIG. 4A shows an example interface 400 of a lock control mobile application in accordance with some aspects of the systems and methods herein. The interface 400 shown in FIG. 4A may be the same or similar to that of FIG. 3A. The interface 400 may be a swipe interface, wherein a user may change between a washer between the washer tab 401 and the dryer tab 402 by swiping the screen. The user may also make the selection of the washer tab 401 and the dryer tab 402 by tapping or touching the tab.

The dryer tab 402 interface may be similar to or the same as that of the washer tab 301 and 401 interface displayed in FIGS. 3A and 4A. The dryer tab 402 interface may show a list of available dryers 403 and a list of unavailable dryers 404. Information and functionality related to the available dryers 403 and the unavailable dryers 404 may be displayed similarly to that of the washer tab 401 interface.

Figure 4B:
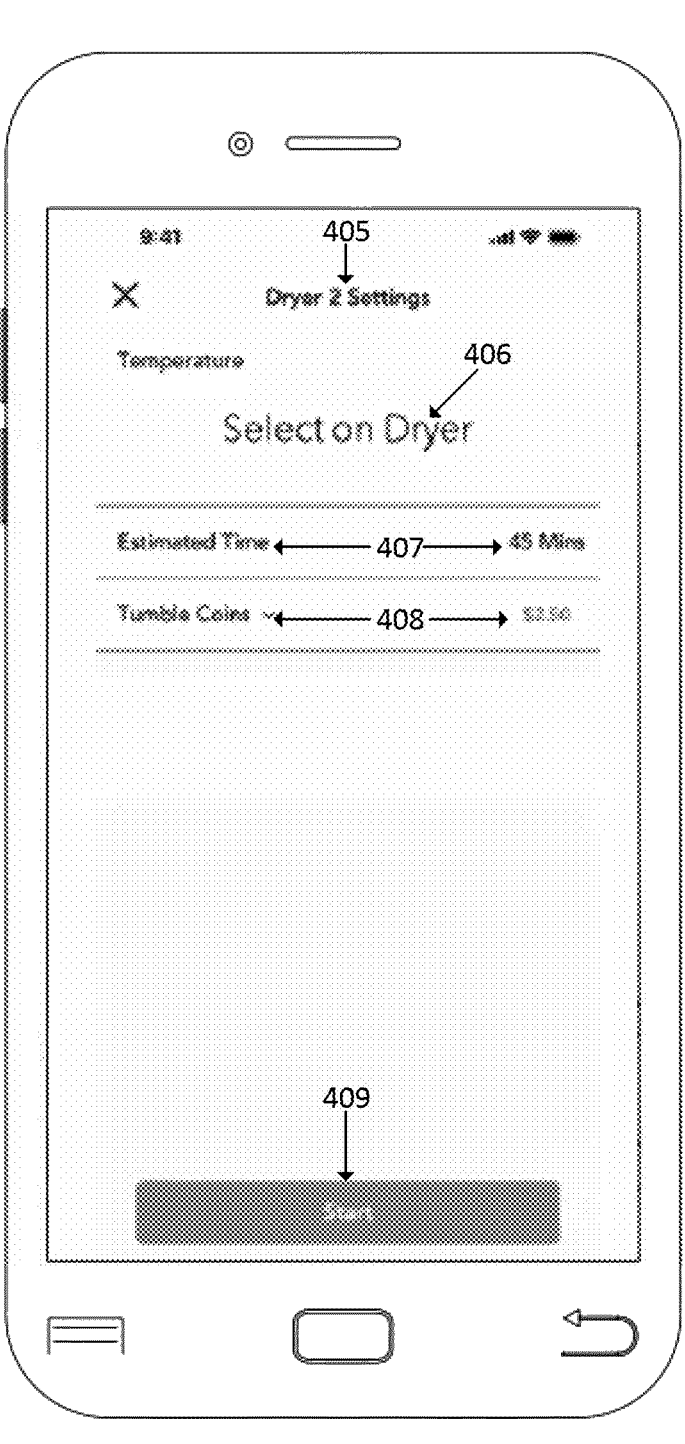
FIG. 4B shows an example interface of a lock control mobile application in accordance with some aspects of the systems and methods herein.
Figure 4C:
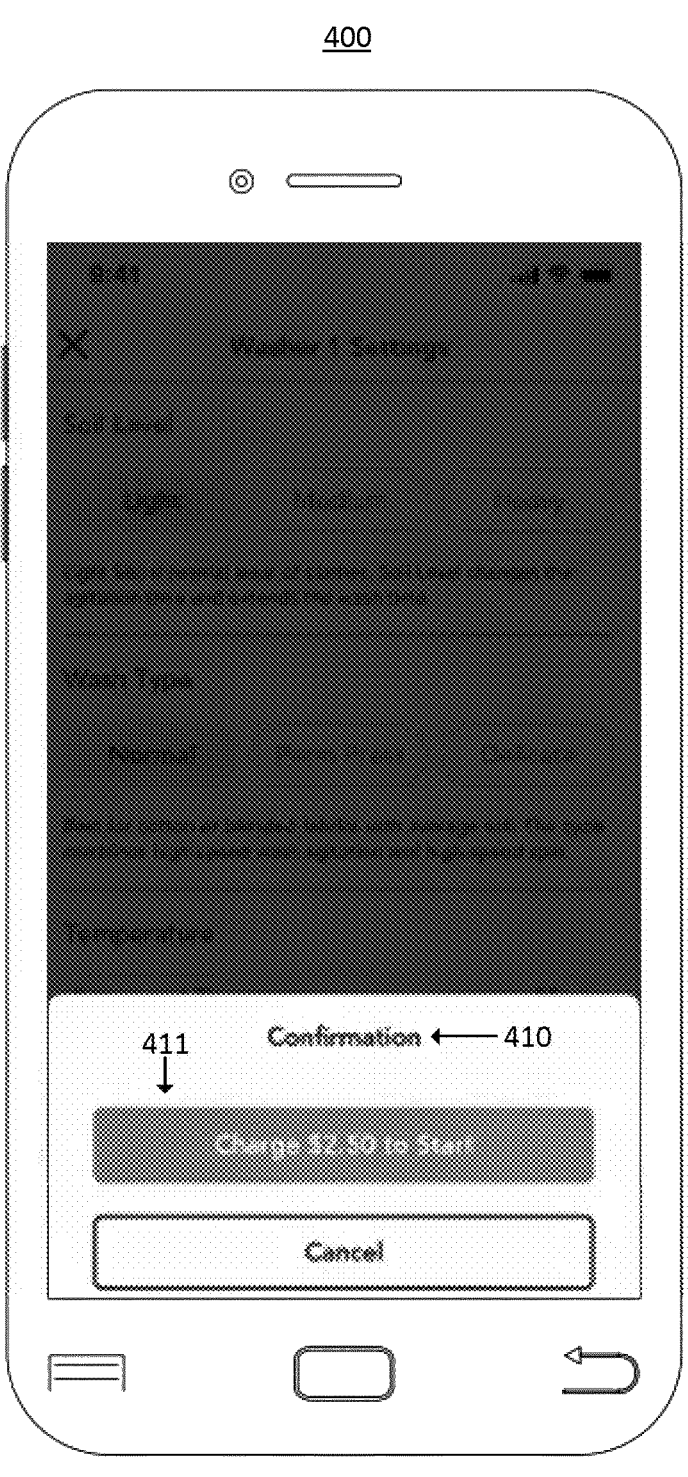
FIG. 4C shows an example interface of a lock control mobile application in accordance with some aspects of the systems and methods herein.

FIG. 4B-4C show the interface 400 after the selection of an available machine (dryer) from the list of available machines (dryers) 403. After selection of a machine, machine settings 405 may be displayed to the user. The settings may be automatically populated, selected by the user on the interface, or provided from selections made on the physical machine. The selection made on the machine itself may be displayed and updated on the interface 300. The machine may transmit information relating to the physical/manual selections made by the user to the server 110 and client device 105.

Similar to FIGS. 3B-3C, the user may choose operation type, operation parameters and addition options associated with the operation type, parameters or machine itself. As shown on FIG. 4B, the interface provides a temperature selection 406. Other options that may be provided to the user may be based on the functionality and preset operations of the selected machine. Some machines may provide different operational parameters for preset functions such as settings designed for delicates, towels, bedding, wool, silk, denim or other textiles to be dried or laundered in general. Upon selection of the temperature 406 and any other available options, the user may be provided with an estimated duration 407 of the operation, and a cost 408 associated with the selections. The user may choose a funding source to pay for the cost 408. The selection and payment of the fee may be the same or similar to that of the process as described above with regard to FIGS. 3A-C. In some embodiments, the user may select a duration they wish to use the dryer for, and be prompted to pay the determined amount based on the duration and other operational parameters. The user may also select an amount to add to the machine, and the duration of the operation may then be based on the amount paid and the operational parameters selected by the user. The payment confirmation window 410 and pay and start 411 may be displayed and interacted with in the same way as described with regard to FIG. 3C.

Figure 4D:
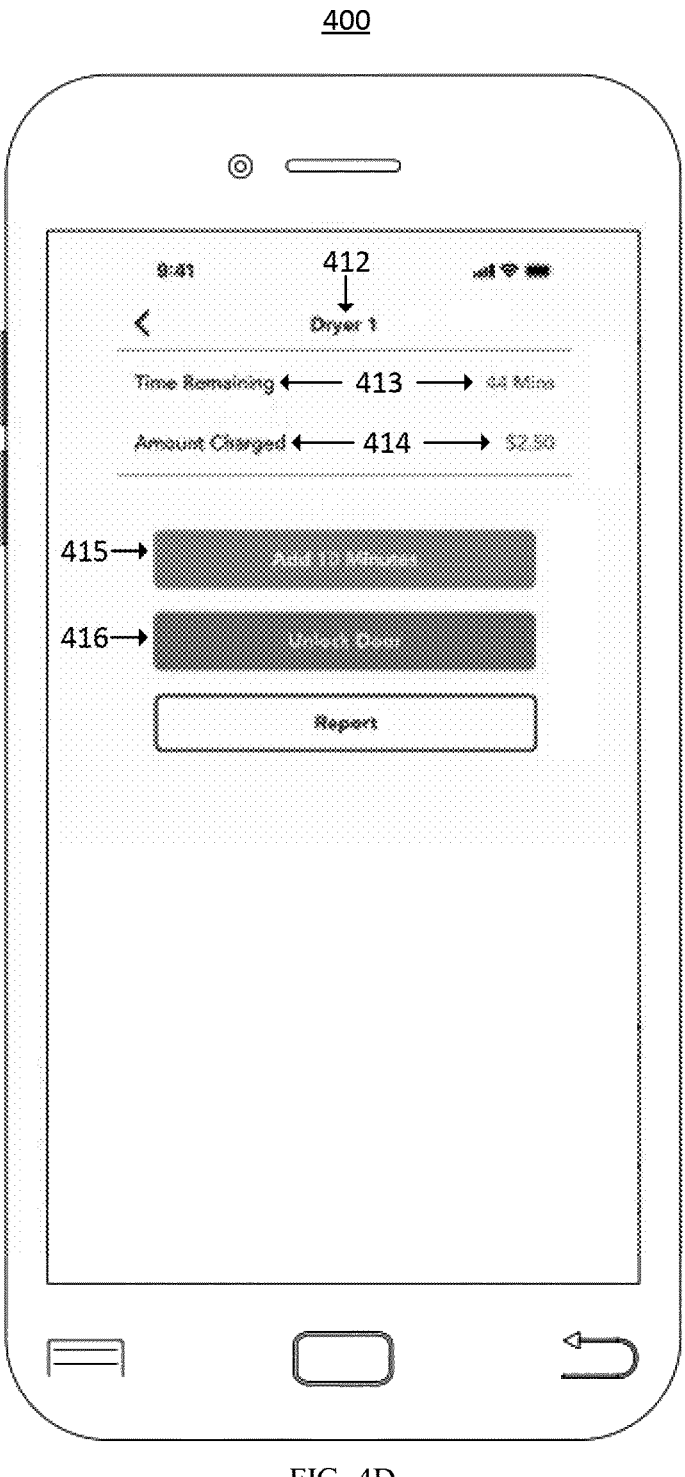
FIG. 4D shows an example interface of a lock control mobile application in accordance with some aspects of the systems and methods herein.
Figure 4E:
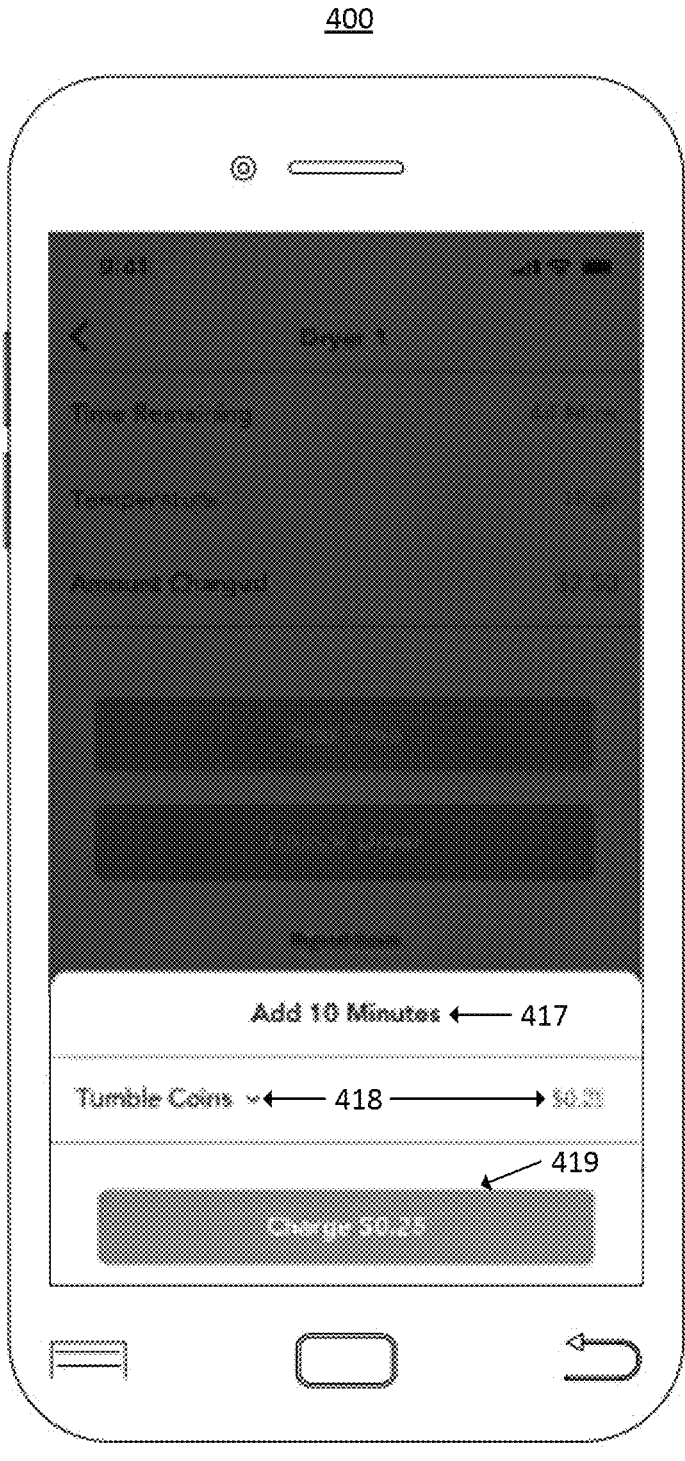
FIG. 4E shows an example interface of a lock control mobile application in accordance with some aspects of the systems and methods herein.

FIG. 4D shows a machine details window 412, similar to the machine details window 319 of FIG. 3F. The machine details window 412 may display information relating to the operation being performed on the machine or information relating to the machine itself. As shown in FIG. 4D, information relating to the operation, such as time remaining 413 and amount charged 414 may be displayed. In addition to displaying operational information and machine status, the interface may comprise a time extension button 415 and a lock/unlock button 416. During operation of the dryer, a user may select the time extension button 415 to add additional time to the current operation of the machine. Upon selection of the time extension button 415, the user may be prompted to authorize a charge associated with the additional time as shown in FIG. 4E. The time extension may be for predetermined amount of time, for blocks of time, or for an exact amount of time. The user may also choose an option to automatically have funds pulled from the user's electronic wallet in a pay-as-you-go manner. The user may be charged in intervals of time while operating the machine, and charged a prorated amount for the final interval after the user stops the machine. Regarding FIG. 4E, the confirmation window 417 may be displayed to the user after a selection of the time extension button 415. The confirmation window 417 may include cost and funding source 418 and a charge button 419 to confirm the charge.

Figure 4F:
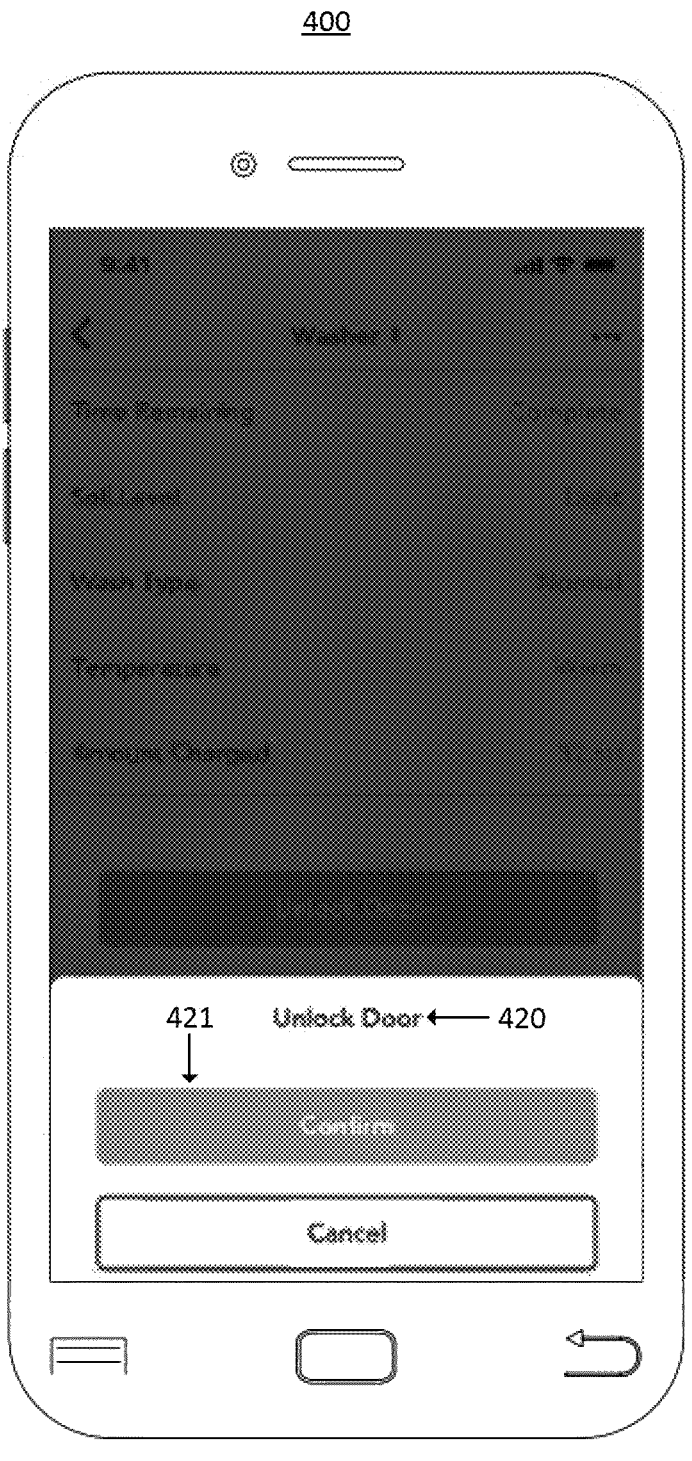
FIG. 4F shows an example interface of a lock control mobile application in accordance with some aspects of the systems and methods herein.

Regarding the lock/unlock button 416 of FIG. 4D, the user may engage or disengage the locking mechanism of the machine door by selecting the lock/unlock button 416. The unlock/lock button 416 may operate as a toggle to toggle between locking and unlocking the machine door. A status of the locking mechanism may be provided to the user in the machine details window 412 or the dryer tab 402 interface next to the machine in the list of unavailable machines 404. The status of the locking mechanism may also be indicated on the lock/unlock button 416 itself. The indication may be an icon depicting a locked or unlocked lock. FIG. 4F shows the interface upon selecting the lock/unlock button 416. A lock/unlock confirmation 420 window may be displayed to the user. The user may select confirm 421 or cancel/return to the previous screen.

Figure 4G:
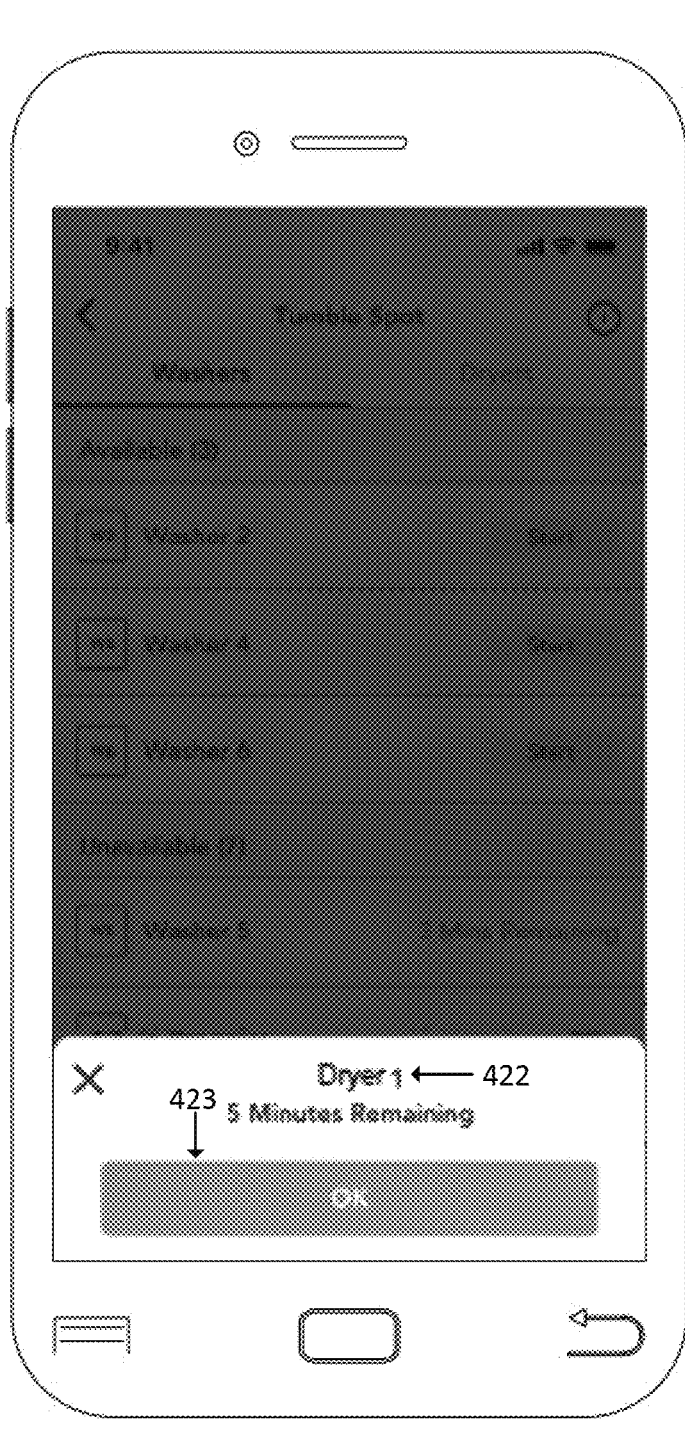
FIG. 4G shows an example interface of a lock control mobile application in accordance with some aspects of the systems and methods herein.
Figure 4H:
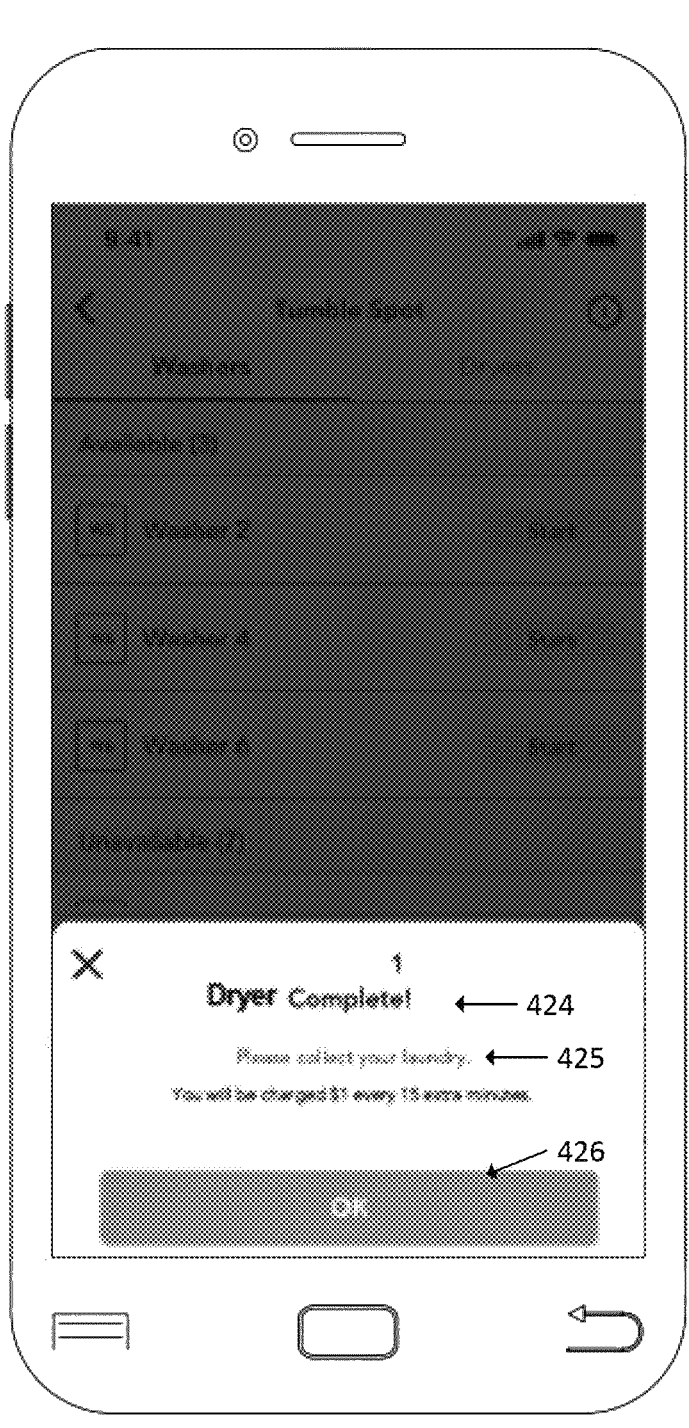
FIG. 4H shows an example interface of a lock control mobile application in accordance with some aspects of the systems and methods herein.

FIG. 4G shows an example notification 422 displayed to the user after the time remaining drops below a predefined threshold, such as the "5 minutes remaining" notification. The user may choose to dismiss the notification by selecting the ok button 423. The notification may also provide the user with an option to add additional time to the machine operation. FIG. 4H shows an example completion notification 424 displayed to the user. The completion notification 424 may comprise additional information 425, such as notifying the user of a collection time window, and charge rates for not complying with the collection requirements. The user may be required to unlock the machine within a predetermined amount of time, such as within 15 minute of completion of the operation. If the machine is not unlocked within the predetermined amount of time the user may be charged a fee for the violation. The fee may be charged in preset blocks of time, such as 5, 10 or 15 minute intervals. Any interval may be set by the system, administrator or facility operator. Fees may be calculated for the exact amount of time between the unlocking and the end of the predetermined grace period for unlocking the machine. A fee may also start to accrue immediately following the completion of the operation. In such a case, the user may be refunded for the charge if they unlock the machine before a grace period window ends. The fees may be based on the current usage of the facility and other machines in the facility. The rate may increase as the availability of machines decreases to encourage users to collect their laundry in a timely fashion. Fees may also be based on a specific user's usage history. For example, if a user habitually does not unlock and collect their laundry within the time allotted, addition penalties may be added. The additional fees charged to the habitual offenders may also be based on facility usage when exceeding the time allotted. For example, a first user who habitually fails to unlock their machines within the grace period, but does so during off-peak hours may be penalized less than a second user that habitually fails to unlock their machine during peak operation hours. If in the future, both users violate the grace period under exactly the same conditions (e.g. machine availability, peak hour pricing) the second user would be charged a higher fee because of his past transgressions.

Though the operation of washing machines and dryers are described separately, some or all of the functionality, methods and process flows may be used by both. For example, time extension and lock/unlock options may be provided while operating a washing machine in a similar or same fashion as they are provided during the operation of the dryer. The notifications described with regards to FIGS. 3 and 4, may be used by both washing machines and dryers. Other types of machines may also be configured to use the same control mechanism and notifications as the washing machines and dryers described above.

Figure 5:
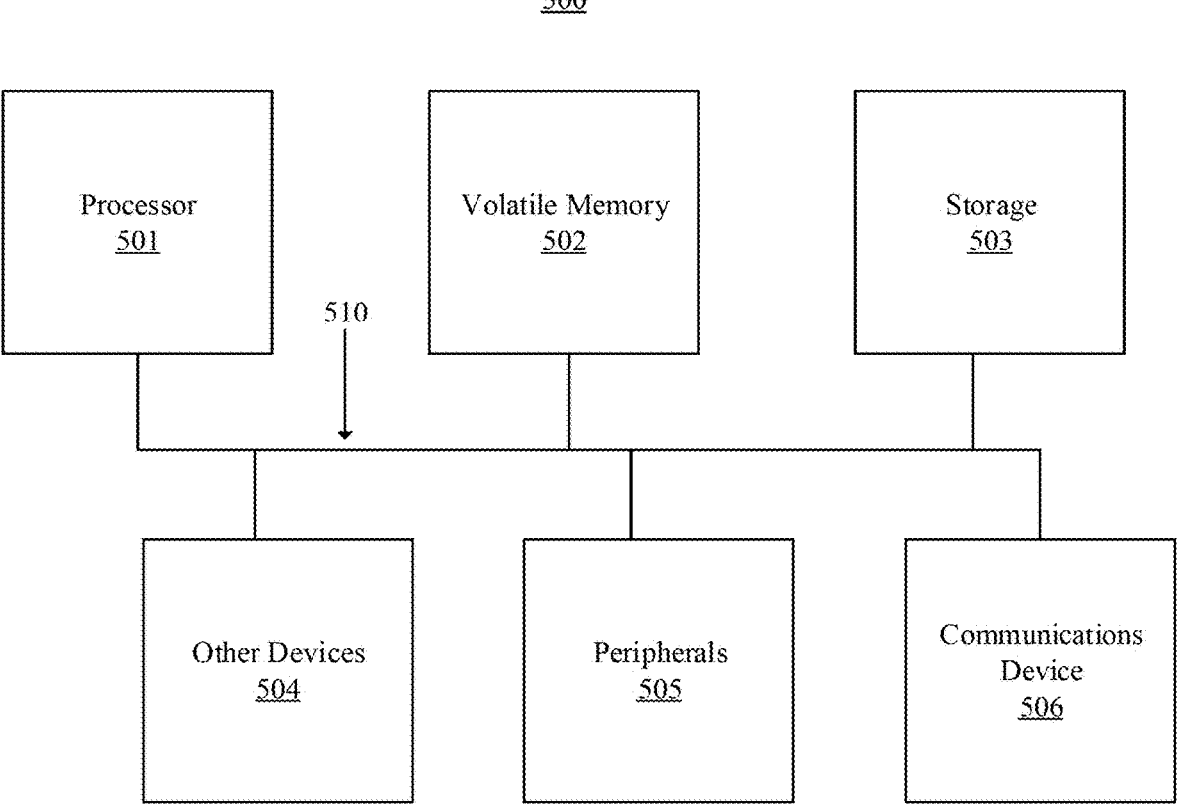
FIG. 5 is a diagram illustrating an exemplary computer that may perform processing in some embodiments and in accordance with aspects of the present disclosure.

FIG. 5 is a diagram illustrating an exemplary computer that may perform processing in some embodiments. Exemplary computer 500 may perform operations consistent with some embodiments. The architecture of computer 500 is exemplary. Computers can be implemented in a variety of other ways. A wide variety of computers can be used in accordance with the embodiments herein.

Processor 501 may perform computing functions such as running computer programs. The volatile memory 502 may provide temporary storage of data for the processor 501. RAM is one kind of volatile memory. Volatile memory typically requires power to maintain its stored information. Storage 503 provides computer storage for data, instructions, and/or arbitrary information. Non-volatile memory, which can preserve data even when not powered and including disks and flash memory, is an example of storage. Storage 503 may be organized as a file system, database, or in other ways. Data, instructions, and information may be loaded from storage 503 into volatile memory 502 for processing by the processor 501.

The computer 500 may include peripherals 505. Peripherals 505 may include input peripherals such as a keyboard, mouse, trackball, video camera, microphone, and other input devices. Peripherals 505 may also include output devices such as a display. Peripherals 505 may include removable media devices such as CD-R and DVD-R recorders/players. Communications device 506 may connect the computer 500 to an external medium. For example, communications device 506 may take the form of a network adapter that provides communications to a network. A computer 500 may also include a variety of other devices 504. The various components of the computer 500 may be connected by a connection medium 510 such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A system comprising one or more processors, and a non-transitory computer-readable medium including one or more sequences of instructions that, when executed by the one or more processors, cause the system to perform the operations of:

receiving, from a server, a list of a plurality of machines comprising a listing of washing machines and/or a listing of dryers, wherein the server wirelessly communicates with a plurality of machine controllers connected to the plurality of machines;

displaying, via a machine control user interface, a first group of one or more machines, wherein the machine control user interface displays the first group of one or more machines as available for use, and wherein the machine control user interface comprises a portion listing washing machines and/or a portion listing dryers;

receiving an input, via the machine control user interface, for a selection of one of the machines indicated as available for use;

receiving, by the server an indication of the selected machine; and sending, by the server, to a machine controller connected to a first physical machine which is associated with the selected machine, a signal to start an operation of the first physical machine.

2. The system of claim 1, wherein the one or more processors, further cause the system to perform the operations:

in response to receiving an input via the machine control user interface, retrieving status information from the server for machines started via the machine control user interface; and displaying, via the machine control user interface, a listing of the started machines with a displayed machine identifier and a remaining amount of time for each of the listed started machines.

3. The system of claim 1, wherein the machine control user interface is configured to display a machine number for each of the displayed machines.

4. The system of claim 1, wherein the machine control user interface portion listing washing machines comprises a vertically displayed listing of multiple washing machines indicated as available, and a vertically displayed listing multiple washing machines indicated as unavailable, wherein each of the displayed machines includes a displayed machine identifier.

5. The system of claim 1, wherein the machine control user interface is configured to display a second group of one or more machines as available for use.

6. The system of claim 1, wherein the receiving the input for a selection comprises:

displaying, via the machine control user interface, a start button associated with an available machine; and receiving, as the input, the selection of the start button for the selected machine.

7. The system of claim 1, wherein the one or more processors, further cause the system to perform the operations:

displaying, via the machine control user interface, a second plurality of machines wherein the second plurality of machines are indicated as unavailable, wherein an unavailable machine includes a remaining time indicated for the unavailable machine.

8. The system according to claim 1, wherein the machine control user interface is configured to alternate the display of the portion listing the washing machines and the display of the portion listing the dryers.

9. The system according to claim 1, wherein the start of the operation of the first physical machine comprises:

triggering a payment interface on the selected machine, wherein the signal is pulsed a number of times based on a payment amount.

10. The system according to claim 1, wherein the server changes a price associated with the use of the plurality of machines.

11. A method of controlling the operation of a plurality of washing machines and dryers, comprising:

receiving, from a server, a list of a plurality of machines comprising a listing of washing machines and/or a listing of dryers, wherein the server wirelessly communicates with a plurality of machine controllers connected to the plurality of machines;

displaying, via a machine control user interface, a first group of one or more machines, wherein the machine control user interface displays the first group of one or more machines as available for use, and wherein the machine control user interface comprises a portion listing washing machines and/or a portion listing dryers;

receiving an input, via the machine control user interface, for a selection of one of the machines indicated as available for use;

receiving, by the server an indication of the selected machine; and sending, by the server, to a machine controller connected to a first physical machine which is associated with the selected machine, a signal to start an operation of the first physical machine.

12. The method of claim 1, further comprising:

in response to receiving an input via the machine control user interface, retrieving status information from the server for machines started via the machine control user interface; and displaying, via the machine control user interface, a listing of the started machines with a displayed machine identifier and a remaining amount of time for each of the listed started machines.

13. The method of claim 11, wherein the machine control user interface is configured to display a machine number for each of the displayed machines.

14. The method of claim 11, wherein the machine control user interface portion listing washing machines comprises a vertically displayed listing of multiple washing machines indicated as available, and a vertically displayed listing multiple washing machines indicated as unavailable, wherein each of the displayed machines includes a displayed machine identifier.

15. The method of claim 11, wherein the machine control user interface is configured to display a second group of one or more machines as available for use.

16. The method of claim 11, wherein the receiving the input for a selection comprises:

displaying, via the machine control user interface, a start button associated with an available machine; and receiving, as the input, the selection of the start button for the selected machine.

17. The method of claim 11, further comprising:

displaying, via the machine control user interface, a second plurality of machines wherein the second plurality of machines are indicated as unavailable, wherein an unavailable machine includes a remaining time indicated for the unavailable machine.

18. The method according to claim 1, wherein the machine control user interface is configured to alternate the display of the portion listing the washing machines and the display of the portion listing the dryers.

19. The method according to claim 1, wherein the start of the operation of the first physical machine comprises the operations of:

triggering a payment interface on the selected machine, wherein the signal is pulsed a number of times based on a payment amount.

20. The method according to claim 1, wherein the server changes a price associated with the use of the plurality of machines.

* * * * *